(12) United States Patent
Choi et al.

(10) Patent No.: US 10,949,012 B2
(45) Date of Patent: Mar. 16, 2021

(54) ELECTRONIC DEVICE COMPRISING FORCE SENSOR

(71) Applicant: Samsung Electronics Co., Ltd., Suwon-si (KR)

(72) Inventors: Seung Min Choi, Seongnam-si (KR); Doo Suk Kang, Suwon-si (KR); Kyu Hong Kim, Yongin-si (KR); So Young Kim, Suwon-si (KR); Geon Soo Kim, Suwon-si (KR); Yo Han Lee, Seongnam-si (KR); Bo Kun Choi, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/668,626

(22) Filed: Aug. 3, 2017

(65) Prior Publication Data

US 2018/0039368 A1   Feb. 8, 2018

(30) Foreign Application Priority Data

Aug. 3, 2016 (KR) .......................... 10-2016-0098727

(51) Int. Cl.
*G06F 3/041* (2006.01)
*G06F 3/0488* (2013.01)
(Continued)

(52) U.S. Cl.
CPC .......... *G06F 3/0414* (2013.01); *G06F 1/3215* (2013.01); *G06F 1/3262* (2013.01);
(Continued)

(58) Field of Classification Search
CPC .......... G06F 3/041–047; G06F 3/0414–04144
See application file for complete search history.

(56) References Cited

U.S. PATENT DOCUMENTS 9,557,844 B2   1/2017   Lee et al.
2008/0204427 A1   8/2008   Heesemans et al.
(Continued)

FOREIGN PATENT DOCUMENTS

KR   10-2010-0044770 A   4/2010
KR      10-1032632 B1   5/2011
(Continued)

OTHER PUBLICATIONS

International Search Report dated Nov. 22, 2017 in connection with International Patent Application No. PCT/KR2017/008339.
(Continued)

*Primary Examiner* — Hang Lin

(57) ABSTRACT

An electronic device includes a housing, a display, a touch sensor sensing a touch of an external object, a force sensor sensing pressure by the touch, and a processor that is electrically connected with the display. The touch sensor, the force sensor and a memory are electrically connected with the processor. The memory stores instructions that, when executed, cause the processor to activate at least part of the force sensor while the display is turned off, or while the display operates in a low-power mode, to perform a first function if pressure of a first level by the touch is sensed in the at least part of the force sensor. The processor also performs a second function associated with the first function if pressure of a second level by the touch is sensed in the force sensor while the first function is performed.

13 Claims, 19 Drawing Sheets

(51) Int. Cl.
  *G06F 3/0484* (2013.01)
  *G06F 1/3234* (2019.01)
  *G06F 1/3215* (2019.01)
  *G06F 3/01* (2006.01)
  *G06F 3/16* (2006.01)

(52) U.S. Cl.
  CPC ............ *G06F 1/3265* (2013.01); *G06F 3/016* (2013.01); *G06F 3/0416* (2013.01); *G06F 3/04847* (2013.01); *G06F 3/04883* (2013.01); *G06F 3/165* (2013.01); *G06F 3/167* (2013.01); *G06F 3/0488* (2013.01); *G06F 2203/0381* (2013.01); *G06F 2203/04105* (2013.01); *G06F 2203/04803* (2013.01); *Y02D 10/00* (2018.01); *Y02D 30/50* (2020.08)

(56) References Cited

U.S. PATENT DOCUMENTS

| | | |
|---|---|---|
| 2009/0242282 A1 | 10/2009 | Kim et al. |
| 2011/0080367 A1* | 4/2011 | Marchand ............ G06F 1/3215 345/174 |
| 2011/0141052 A1 | 6/2011 | Bernstein et al. |
| 2013/0181931 A1 | 7/2013 | Kinoshita |
| 2013/0210493 A1* | 8/2013 | Tal .................... H04W 52/0261 455/566 |
| 2014/0009441 A1 | 1/2014 | Bernstein et al. |
| 2015/0077398 A1* | 3/2015 | Yairi ...................... G06F 3/016 345/175 |
| 2015/0145796 A1 | 5/2015 | Lee et al. |
| 2015/0234446 A1* | 8/2015 | Nathan .................. G06F 1/3262 345/174 |
| 2016/0011768 A1 | 1/2016 | Yim et al. |
| 2016/0018942 A1* | 1/2016 | Kang .................... G06F 3/0488 345/173 |
| 2016/0062500 A1* | 3/2016 | Kessler ................. G06F 3/0414 345/174 |
| 2016/0188181 A1 | 6/2016 | Smith |
| 2016/0291771 A1* | 10/2016 | Wells ................... G06F 3/0488 |
| 2017/0045983 A1* | 2/2017 | Karunamuni ....... G06F 3/04842 |
| 2017/0115876 A1 | 4/2017 | Lee et al. |
| 2017/0192598 A1* | 7/2017 | Seen .................... G02B 6/0031 |
| 2018/0164939 A1* | 6/2018 | Duan .................... G06F 3/0414 |

FOREIGN PATENT DOCUMENTS

| | | |
|---|---|---|
| KR | 10-2013-0043292 A | 4/2013 |
| KR | 1020150061336 A | 6/2015 |
| KR | 10-2016-0071264 A | 6/2016 |

OTHER PUBLICATIONS

Supplementary European Search Report dated Apr. 12, 2019 in connection with European Patent Application No. 17 83 7243, 11 pages.

* cited by examiner

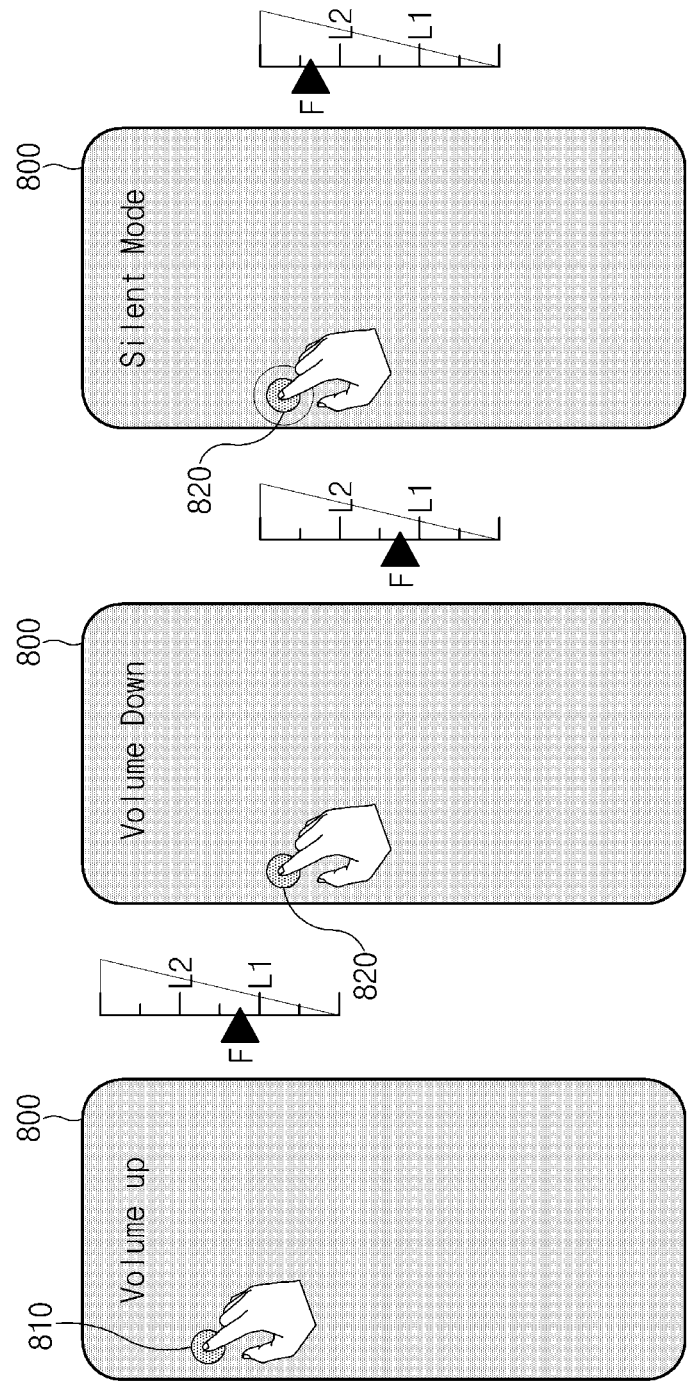

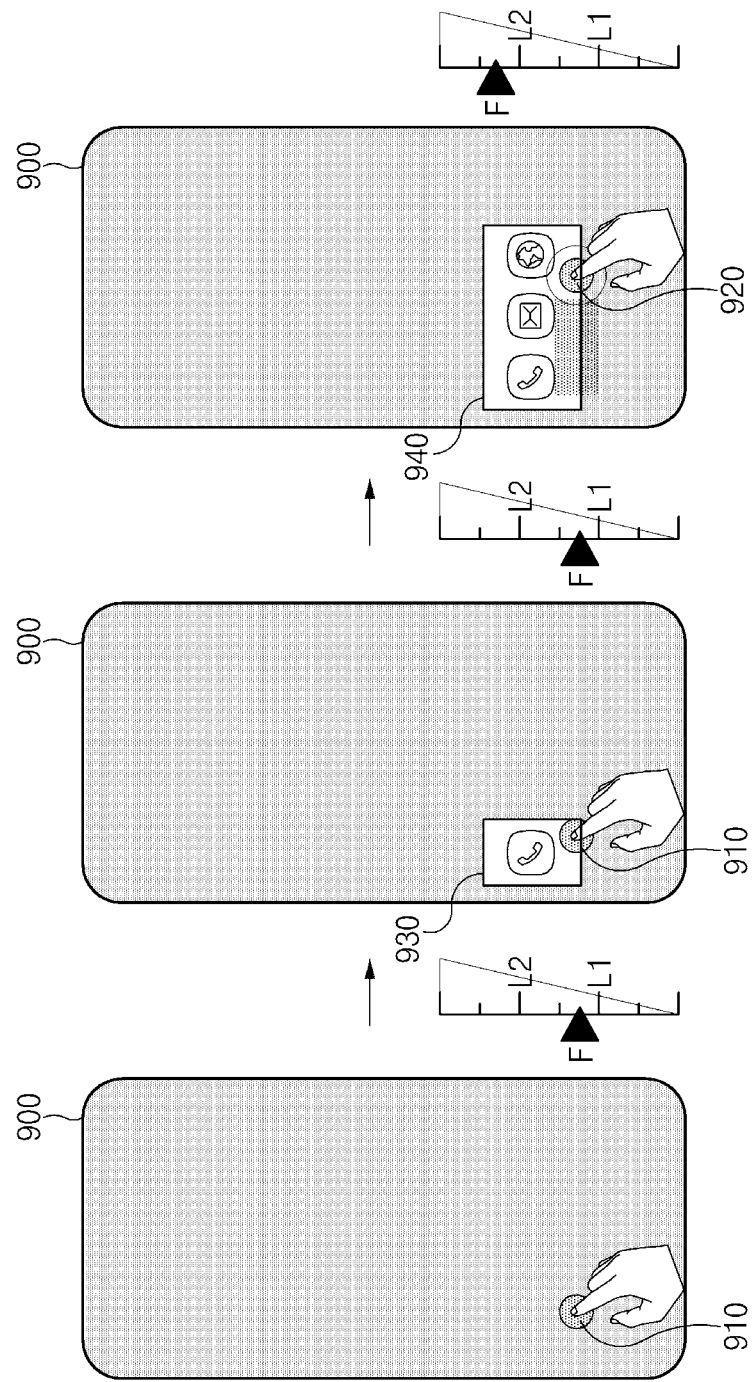

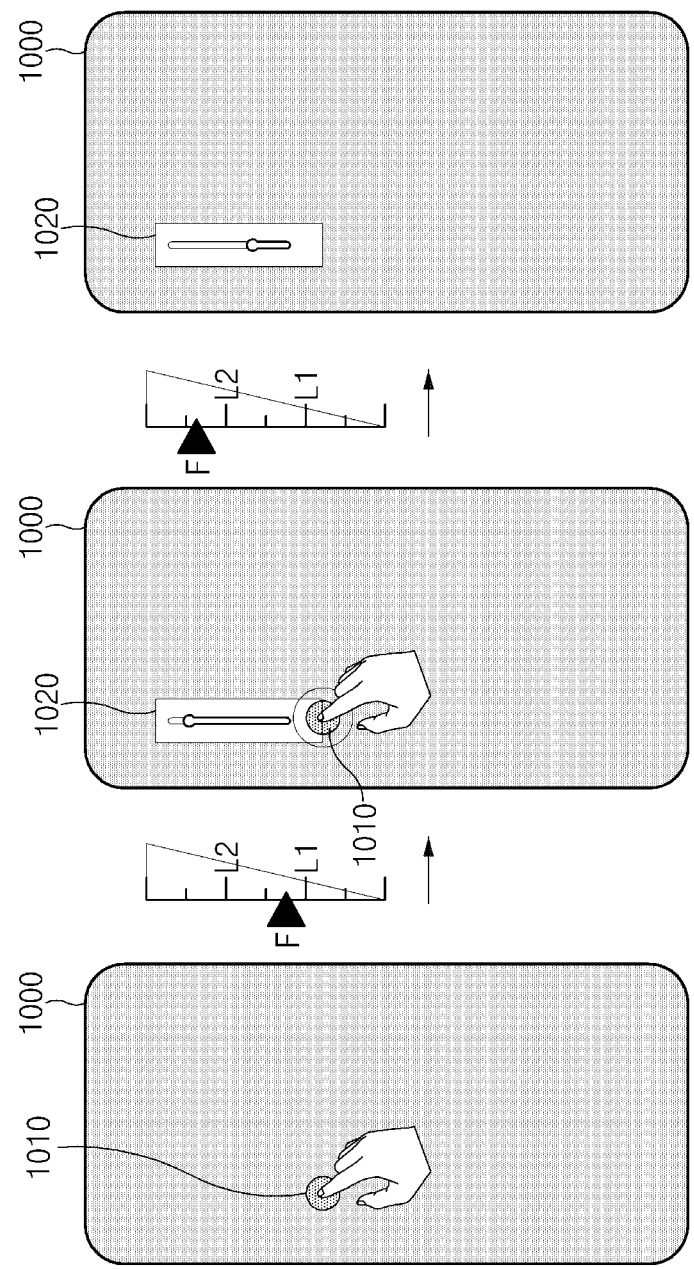

ELECTRONIC DEVICE COMPRISING FORCE SENSOR

CROSS-REFERENCE TO RELATED APPLICATION AND CLAIM OF PRIORITY

The present application is related to and claims the benefit under 35 U.S.C. § 119(a) of a Korean patent application filed on Aug. 3, 2016, in the Korean Intellectual Property Office and assigned Serial number 10-2016-0098727, the entire disclosure of which is hereby incorporated by reference.

TECHNICAL FIELD

The present disclosure relates to a technology for providing a user interface associated with a force sensor.

BACKGROUND

With the development of electronic technologies, various types of electronic products are being developed and distributed. In particular, an electronic device, which has a variety of functions, such as a smartphone, a tablet PC, or a wearable device is being widely supplied nowadays. The above-described electronic device may include a touch sensor as an input device for an intuitive input. Also, to make a three-dimensional input possible by sensing the intensity of a touch, nowadays, there is supplied an electronic device that is equipped with a force sensor configured to sense the intensity of the touch.

Even though an electronic device including the force sensor is supplied, a user interface using the force sensor is not yet fully developed. Advantages of the force sensor fail to be sufficiently used due to the absence of a user interface of a new manner that cannot be implemented by a conventional touch sensor.

SUMMARY

To address the above-discussed deficiencies, it is a primary object to provide at least the above-mentioned problems and/or disadvantages and to provide at least the advantages described below. Accordingly, an aspect of the present disclosure is to provide various user interfaces based on pressure sensed by a force sensor while a display is turned off.

In accordance with an aspect of the present disclosure, an electronic device according to an embodiment may include a housing that includes a first surface facing a first direction and a second surface facing a second direction opposite to the first direction, a display that is interposed between the first surface and the second surface and exposed through the first surface, a touch sensor that is interposed between the first surface and the second surface and senses a touch of an external object on the display, a force sensor that is interposed between the first surface and the second surface and senses pressure by the touch, a processor that is electrically connected with the display, the touch sensor, and the force sensor, and a memory that is electrically connected with the processor. The memory may store instructions that, when executed, cause the processor to activate at least part of the force sensor while the display is turned off or while the display operates in a low-power mode, to perform a first function if pressure of a first level by the touch is sensed in the at least part of the force sensor, and to perform a second function associated with the first function if pressure of a second level by the touch is sensed in the force sensor while the first function is performed.

In accordance with another aspect of the present disclosure, an electronic device according to an embodiment may include a housing that includes a first surface facing a first direction and a second surface facing a second direction that is opposite to the first direction, a display that is interposed between the first surface and the second surface and exposed through the first surface, a touch sensor that is interposed between the first surface and the second surface and configured to sense a touch of an external object on the display, a force sensor that is interposed between the first surface and the second surface and configured to sense pressure by the touch, at least one processor that is electrically connected with the display, the touch sensor, and the force sensor, and a memory that is electrically connected with the processor. The memory may store instructions that, when executed, cause the processor to activate at least part of the force sensor while the display is turned off or while the display operates in a low-power mode, to receive data associated with the pressure by the touch from the force sensor while the display is turned off or while the display operates in a low-power mode, to determine whether the pressure is larger than or equal to a specified level, based on the data associated with the pressure, and to turn on, if the pressure is larger than or equal to the specified level, the display partially and perform a function.

In accordance with another aspect of the present disclosure, an electronic device may include a housing that includes a first surface facing a first direction and a second surface facing a second direction that is opposite to the first direction, a display that is interposed between the first surface and the second surface and is exposed through the first surface, a touch sensor that is interposed between the first surface and the second surface and senses a touch of an external object on the display, a force sensor that is interposed between the first surface and the second surface and senses pressure by the touch, a wireless communication circuit that communicates with an external device wirelessly, at least one processor that is electrically connected with the display, the touch sensor, the force sensor, and the wireless communication circuit, and a memory that is electrically connected with the processor. The memory may store instructions that, when executed, cause the processor to generate a notification based at least partly on at least one internal event or a signal from an external device while the display is turned off or while the display operates in a low-power mode, to display a message associated with the notification on part of the display, to activate the force sensor after generating the notification, to receive data associated with pressure by the touch from the force sensor while the message is displayed, to determine whether the pressure is larger than or equal to a specified level, and to perform, if the pressure is larger than or equal to the specified level, a function associated with the notification.

In accordance with another aspect of the present disclosure, an electronic device according to an embodiment may include a housing that includes a first surface facing a first direction and a second surface facing a second direction opposite to the first direction, a display that is interposed between the first surface and the second surface and is exposed through the first surface, a touch sensor that is interposed between the first surface and the second surface and senses a touch of an external object on the display, a force sensor that is interposed between the first surface and the second surface and senses pressure by the touch, a wireless communication circuit that communicates with an external device, at least one processor that is electrically connected with the display, the touch sensor, the force sensor, and the wireless communication circuit, and a memory that is electrically connected with the processor. The memory may store at least one application program including a user interface and may further store instructions that, when executed, cause the processor to execute the application program while at least part of the display is turned off or while the at least part of the display operates in a low-power mode, to activate the force sensor while the application program is executed, to receive data associated with the pressure by the touch from the force sensor while the application program is executed, to determine whether the pressure is larger than or equal to a specified level, based on the data associated with the pressure, and to perform, if the pressure is larger than or equal to the specified level, a function associated with the application program.

Other aspects, advantages, and salient features of the disclosure will become apparent to those skilled in the art from the following detailed description, which, taken in conjunction with the annexed drawings, discloses various embodiments of the present disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 8A-8C are views for describing an example operation of the electronic device according to an embodiment;

FIGS. 9A-9C are views for describing an example operation of the electronic device according to an embodiment;

FIGS. 10A-10C are views for describing an example operation of the electronic device according to an embodiment;

Throughout the drawings, it should be noted that like reference numbers are used to depict the same or similar elements, features, and structures.

DETAILED DESCRIPTION

Figure 1:
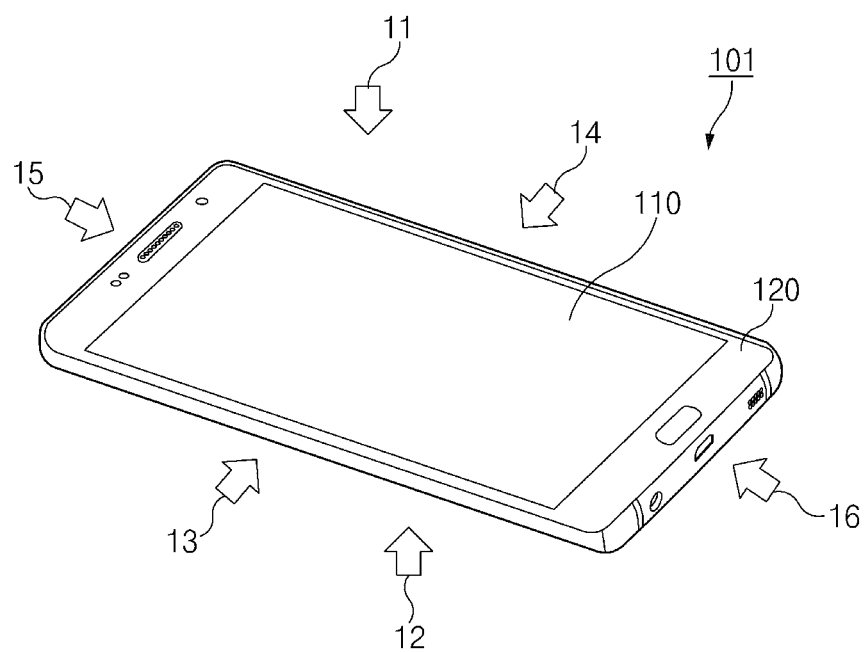
FIG. 1 illustrates an appearance of an electronic device according to an embodiment.

FIGS. 1 through 19, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device.

Hereinafter, various embodiments of the present disclosure may be described with reference to accompanying drawings. Accordingly, those of ordinary skill in the art will recognize that modification, equivalent, and/or alternative on the various embodiments described herein can be variously made without departing from the scope and spirit of the present disclosure. With regard to the description of drawings, similar elements may be marked by similar reference numerals.

In this disclosure, the expressions "have", "may have", "include" and "comprise", or "may include" and "may comprise" used herein indicate existence of corresponding features (e.g., elements such as numeric values, functions, operations, or components) but do not exclude presence of additional features.

In this disclosure, the expressions "A or B", "at least one of A or/and B", or "one or more of A or/and B", and the like may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used in this disclosure may be used to refer to various elements regardless of the order and/or the priority and to distinguish the relevant elements from other elements, but do not limit the elements. For example, "a first user device" and "a second user device" indicate different user devices regardless of the order or priority. For example, without departing the scope of the present disclosure, a first element may be referred to as a second element, and similarly, a second element may be referred to as a first element.

It will be understood that when an element (e.g., a first element) is referred to as being "(operatively or communicatively) coupled with/to" or "connected to" another element (e.g., a second element), it may be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there are no intervening element (e.g., a third element).

According to the situation, the expression "configured to" used in this disclosure may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other components. For example, a "processor configured to (or set to) perform A, B, and C" may mean a dedicated processor (e.g., an embedded processor) for performing a corresponding operation or a generic-purpose processor (e.g., a central processing unit (CPU) or an application processor) which performs corresponding operations by executing one or more software programs which are stored in a memory device.

Terms used in this disclosure are used to describe specified embodiments and are not intended to limit the scope of the present disclosure. The terms of a singular form may include plural forms unless otherwise specified. All the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal unless expressly so defined in various embodiments of this disclosure. In some cases, even if terms are terms which are defined in this disclosure, they may not be interpreted to exclude embodiments of this disclosure.

An electronic device according to various embodiments of this disclosure may include at least one of, for example, smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices. According to various embodiments, the wearable device may include at least one of an accessory type (e.g., watches, rings, bracelets, anklets, necklaces, glasses, contact lens, or head-mounted-devices (HMDs), a fabric or garment-integrated type (e.g., an electronic apparel), a body-attached type (e.g., a skin pad or tattoos), or a bio-implantable type (e.g., an implantable circuit).

According to various embodiments, the electronic device may be a home appliance. The home appliances may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ or PlayStation™), electronic dictionaries, electronic keys, camcorders, electronic picture frames, and the like.

According to another embodiment, an electronic device may include at least one of various medical devices (e.g., various portable medical measurement devices (e.g., a blood glucose monitoring device, a heartbeat measuring device, a blood pressure measuring device, a body temperature measuring device, and the like), a magnetic resonance angiography (MRA), a magnetic resonance imaging (MRI), a computed tomography (CT), scanners, and ultrasonic devices), navigation devices, Global Navigation Satellite System (GNSS), event data recorders (EDRs), flight data recorders (FDRs), vehicle infotainment devices, electronic equipment for vessels (e.g., navigation systems and gyrocompasses), avionics, security devices, head units for vehicles, industrial or home robots, automatic teller's machines (ATMs), points of sales (POSs) of stores, or internet of things (e.g., light bulbs, various sensors, electric or gas meters, sprinkler devices, fire alarms, thermostats, street lamps, toasters, exercise equipment, hot water tanks, heaters, boilers, and the like).

According to an embodiment, the electronic device may include at least one of parts of furniture or buildings/structures, electronic boards, electronic signature receiving devices, projectors, or various measuring instruments (e.g., water meters, electricity meters, gas meters, or wave meters, and the like). According to various embodiments, the electronic device may be one of the above-described devices or a combination thereof. An electronic device according to an embodiment may be a flexible electronic device. Furthermore, an electronic device according to an embodiment of this disclosure may not be limited to the above-described electronic devices and may include other electronic devices and new electronic devices according to the development of technologies.

Hereinafter, electronic devices according to various embodiments will be described with reference to the accompanying drawings. In this disclosure, the term "user" may refer to a person who uses an electronic device or may refer to a device (e.g., an artificial intelligence electronic device) that uses the electronic device.

An electronic device according to an embodiment may include a touch sensor and a force sensor. The electronic device may obtain two-dimensional information about a touch by using the touch sensor and may obtain one-dimensional information about the pressure of the touch by using the force sensor. Accordingly, the electronic device may receive a three-dimensional input from a user. A structure of the electronic device including the touch sensor and the force sensor will be more fully described with reference to FIGS. 1 to 4.

FIG. 1 illustrates an appearance of an electronic device according to an embodiment.

Referring to FIG. 1, an electronic device 101 according to an embodiment may include a display 110 and a housing 120. Various circuits or modules such as a processor, a memory, and the like may be disposed inside the electronic device 101 (i.e., inside the housing 120).

According to an embodiment, the display 110 may be positioned on a front surface of the electronic device 101. For example, the display 110 may be interposed between a front surface (first surface) facing an upper direction (first direction) 11 and a rear surface (second surface) facing a lower direction (second direction) 12 and may be exposed to the outside through the front surface.

The display 110 may output one or more items (e.g., a text, an image, a video, an icon, a widget, a symbol, or the like) or may receive a touch input (including a touch, a hovering, and a "force touch") from a user. To this end, the display 110 may include a cover glass, a display panel, a touch panel, and/or a force sensor, for example. The cover glass, the display panel, the touch panel, and/or the force sensor may have areas (e.g., the substantially the same area) corresponding to each other and may be disposed to be stacked (refer to FIG. 2).

According to an embodiment, the display 110 may be disposed on a front surface of the electronic device 101 and may further extend from the front surface to at least one side surface. For example, the display 110 may extend in a left-side direction 13 and/or a right-side direction 14. Since the display 110 extends in the left-side direction 13 and/or the right-side direction 14, the display 110 may be exposed to the outside through a side surface as well as the front surface.

According to an embodiment, the housing 120 may constitute at least part of an appearance of the electronic device 101. For example, the housing 120 may include a front surface (first surface) facing the first direction 11 and a rear surface (second surface) facing the second direction 12 that is opposite to the first direction 11. A side surface of the housing 120 that surrounds the first surface and the second surface may include a left-side surface facing the left-side direction 13, a right-side surface facing the right-side direction 14, an upper-side surface facing an upper-side direction 15, and a bottom-side surface facing a bottom-side direction 16.

According to an embodiment, to protect various elements inside the electronic device 101 from external impact or dust, the housing 120 may be formed of a plastic injection-molding material, a conductive material (e.g., metal), or a combination thereof. According to an embodiment, the housing 120 may be used as meaning indicating outer surfaces of a plurality of elements. For example, the front surface of the housing 120 may correspond to a cover glass disposed on or over the display 110, and the rear surface of the housing 120 may correspond to a back cover of the electronic device 101.

Figure 2:
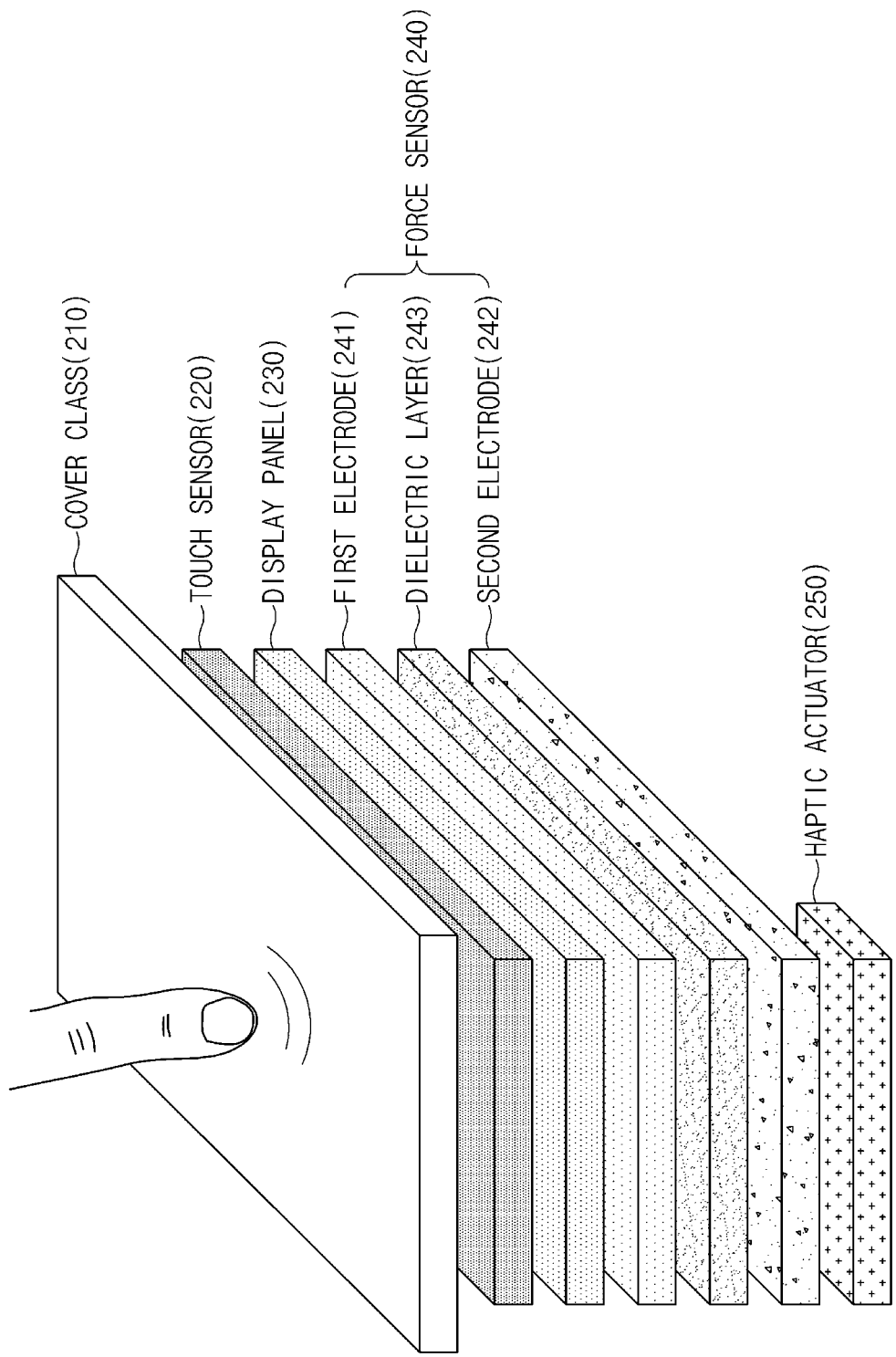
FIG. 2 illustrates a stacked structure of elements included in the electronic device according to an embodiment.

FIG. 2 illustrates a stacked structure of elements included in an electronic device according to an embodiment.

The stacked structure illustrated in FIG. 2 may be applied to the display 110 illustrated in FIG. 1. Accordingly, the elements illustrated in FIG. 2 may be interposed between the front surface (first surface) and the rear surface (second surface) of the electronic device 101 of FIG. 1.

In the stacked structure of the display according to an embodiment, a cover glass 210 may pass light emitted by a display panel 230. The user may perform a "touch" by permitting a portion (e.g., a finger) of his/her body or any other conductor (e.g., an electronic pen) to make contact with the cover glass 210. The cover glass 210 may be formed of, for example, tempered glass, reinforced plastic, a flexible polymer material, or the like and may protect a display and an electronic device equipped with the display from an external shock. According to an embodiment, the cover glass 210 may be also referred to as a "glass window" or "cover window".

According to an embodiment, in a touch sensor 220, various physical quantities (e.g., a voltage, the amount of light, resistance, the amount of charges, or capacitance) may vary due to a contact of an external object. The touch sensor 220 may detect a location of a touch on a display (e.g., one a surface of the cover glass 210) by an external object based on a change in the physical quantity. For example, the touch sensor 220 may include a capacitive touch sensor, a resistive touch sensor, an infrared touch sensor, a piezo touch sensor, or the like. According to an embodiment, the touch sensor 220 may be referred to as various names, such as a touch panel and the like, depending on an implementation shape.

According to an embodiment, the display panel 230 may output at least one content or item (e.g., a text, an image, a video, an icon, a widget, a symbol, or the like). For example, the display panel 230 may include a liquid crystal display (LCD) panel, a light-emitting diode (LED) display panel, an organic LED (OLED) display panel, a microelectromechanical systems (MEMS) display panel, or an electronic paper display panel.

According to an embodiment, the display panel 230 may be integrally implemented with the touch sensor (or touch panel) 220. In this case, the display panel 230 may be also referred to as a "touch screen panel (TSP)" or "touch screen display".

According to an embodiment, a force sensor 240 may detect pressure (or force) on a display (e.g., a surface of the cover glass 210) by an external object (e.g., a finger of the user or an electronic pen). According to an embodiment, the force sensor 240 may include a first electrode 241, a second electrode 242, and a dielectric layer 243. For example, the force sensor 240 may sense pressure of a touch based on capacitance between the first electrode 241 and the second electrode 242, which varies due to the touch. The force sensor 240 is illustrated in FIG. 2 as being implemented with a single sensor. However, embodiments of the present disclosure may not be limited thereto. For example, the force sensor 240 may be implemented with a set of two or more sensors. For example, the force sensor 240 may be implemented with a set of six sensors that are arranged in the form of a 3-by-2 array. A configuration of the force sensor 240 will be more fully described with reference to FIG. 3.

According to an embodiment, when a touch (including a hovering and/or a "force touch") is input by an external object (e.g., a finger of the user or an electronic pen), a haptic actuator 250 may provide the user with a haptic feedback (e.g., vibration). To this end, the haptic actuator 250 may include a piezoelectric member and/or a vibration plate.

The stacked structure of the display above described with reference to FIG. 2 is an example and is able to be variously changed or modified. For example, the touch sensor 220 may be formed directly on a back surface of the cover glass 210 (a so-called cover glass integrated touch panel), may be inserted between the cover glass 210 and the display panel 220 after being separately manufactured (a so-called add-on touch panel), may be formed directly on the display panel 230 (a so-called on-cell touch panel), or may be included inside the display panel 230 (a so-called in-cell touch panel). Also, according to various embodiments, an area-type fingerprint sensor that is implemented to be transparent or opaque may be additionally included in the above-described stacked structure.

Figure 3:
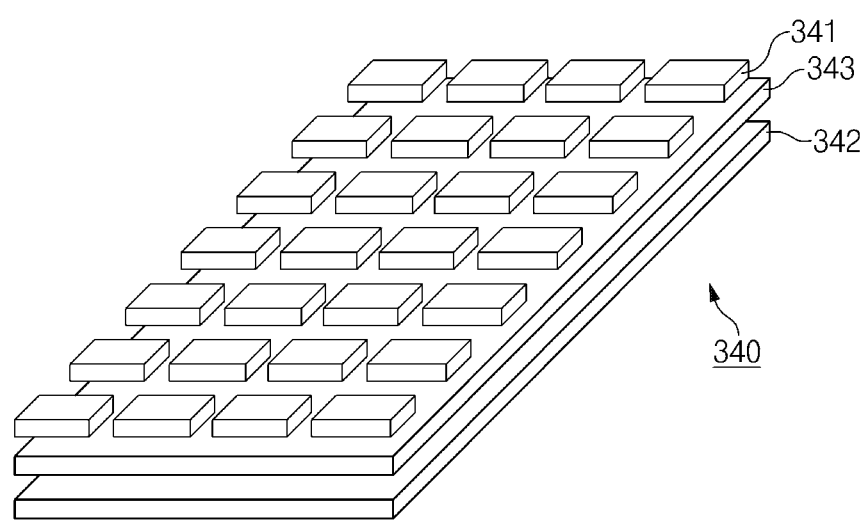
FIG. 3 illustrates a force sensor of the electronic device according to an embodiment.

FIG. 3 illustrates a force sensor of an electronic device according to an embodiment.

Referring to FIG. 3, according to an embodiment, a force sensor 340 may include a first electrode 341, a second electrode 342, and a dielectric layer 343. For example, the force sensor 340 may correspond to the force sensor 240 illustrated in FIG. 2. However, a configuration of the force sensor 340 is not limited to an example illustrated in FIG. 3.

According to an embodiment, the first electrode 341 and/or the second electrode 342 may be implemented to be transparent or opaque. For example, if the first electrode 341 and/or the second electrode 342 is implemented to be opaque, the first electrode 341 and/or the second electrode 342 may be formed of copper (Cu), silver (Ag), magnesium (Mg), titanium (Ti), and/or opaque graphene. Also, if the first electrode 341 and/or the second electrode 342 is implemented to be transparent, the first electrode 341 and/or the second electrode 342 may be formed of indium thin oxide (ITO), indium zinc oxide (IZO), Ag nanowire, metal mesh, transparent conducting polymer, and/or transparent graphene.

According to an embodiment, one of the first electrode 341 and/or the second electrode 342 may be implemented with a metal plate that functions as ground (GND), and the other thereof may be formed to have a repeated polygon pattern by using the above-described member (a so-called self-capacitance manner). The first electrodes 341 are illustrated in FIG. 3 as being implemented with square conductive patches arranged in the form of, but not limited, an array.

For another example, one (e.g., a transmitting terminal Tx) of the first electrode 341 and the second electrode 342 may be formed with a pattern extending in the first direction, and the other (e.g., a receiving terminal Rx) thereof may be formed with a pattern extending in the second direction intersecting the first direction at a specified angle (e.g., a right angle) (a so-called mutual-capacitance manner). According to an embodiment, the first electrode 341 and/or the second electrode 342 may be implemented with a conductive wire bent in the form of a strain gage pattern. For example, the first electrode 341 may be formed directly on a back surface of the display panel 230 (refer to FIG. 2). Also, the first electrode 341 may be printed on a flexible printed circuit board (FPCB), and the FPCB may be attached to one surface of the display panel.

According to an embodiment, the dielectric layer 343 may be formed of a dielectric material having specified capacitance, for example, silicon foam, silicon membrane, optical clean adhesive (OCA), sponge, rubber, polymer (e.g., polycarbonate (PC), and/or polyethylene terephthalate (PET).

Figure 4:
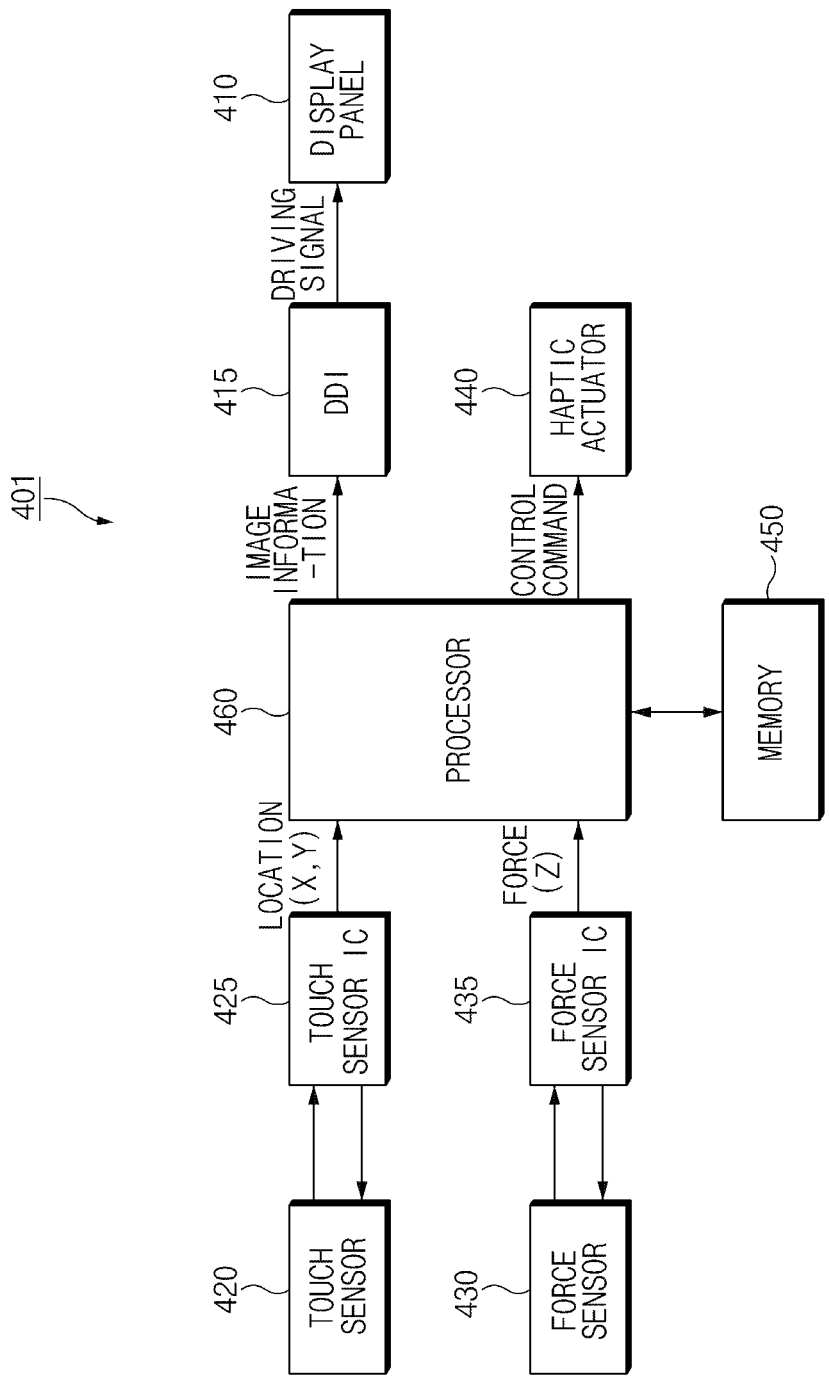
FIG. 4 is a block diagram illustrating a configuration of the electronic device according to an embodiment.

FIG. 4 is a block diagram illustrating a configuration of an electronic device according to an embodiment.

Referring to FIG. 4, an electronic device 401 according to an embodiment may include a display panel 410, a display driving integrated circuit (IC) (DDI) 415, a touch sensor 420, a touch sensor IC 425, a force sensor 430, a force sensor IC 435, a haptic actuator 440, a memory 450, and a processor 460. Descriptions of elements given with reference to FIGS. 1 to 3 may not be repeated here.

According to an embodiment, the display panel 410 may receive a driving signal supplied from the display driving integrated circuit (DDI) 415. The display panel 410 may display a variety of content and/or item (e.g., a text, an image (object), a video, an icon, a functional object, a symbol, or the like) in response to the driving signal. In this specification, the display panel 410 may be combined with the touch sensor 420 and/or the force sensor 430 (e.g., refer to FIG. 2), which is simply referred to as a "display". The display panel 410 may be driven in a low-power (or power-saving) mode. For example, the low-power mode may mean a state in which a driving current of the display panel 410 is restricted, a state in which part of the display panel 410 is turned off, a state in which a color displayed in the display panel 410 is restricted, a state in which brightness of the display panel 410 is restricted, a state in which some of the elements of a user interface displayed in the display panel 410 are restricted, or the like.

According to an embodiment, the display driving integrated circuit (DDI) 415 may supply the display panel 410 with a driving signal, which corresponds to image information received from the processor 460 (host), at a specific frame rate. The display driving integrated circuit 415 may drive the display panel 410 in the low-power mode. Although not illustrated in FIG. 4, according to an embodiment, the display driving integrated circuit 415 may include a graphics RAM, an interface module, an image processing unit, a multiplexer, a display timing controller (T-con), a source driver, a gate driver, and/or an oscillator.

According to an embodiment, in the touch sensor 420, a specified physical quantity (e.g., a voltage, the amount of light, resistance, the amount of charges, capacitance, or the like) may vary due to a touch from the user. According to an embodiment, the touch sensor 420 may be disposed to be overlaid with the display panel 410.

According to an embodiment, the touch sensor IC 425 may sense a variation in a physical quantity in the touch sensor 420 and may calculate a location (X, Y), at which a touch is made, based on the variation in the physical quantity (e.g., a voltage, resistance, capacitance, or the like). The calculated location (or coordinates) may be provided (or reported) to the processor 460.

For example, if a portion (e.g., a finger) of a user body, a stylus (an example of an electronic pen), or the like makes contact with the cover glass 210 (refer to FIG. 2) of a display, a coupling voltage between a transmitting terminal Tx and a receiving terminal Rx included in the touch sensor 420 may vary. For example, the variation in the coupling voltage may be sensed by the touch sensor IC 425, and the touch sensor IC 425 may provide coordinates (X, Y) of a location, at which the touch is made, to the processor 460. The processor 460 may obtain data of the coordinates (X, Y) as an event associated with a user input.

According to an embodiment, the touch sensor IC 425 may be referred to as a "touch IC", a "touch screen IC", a "touch controller", a "touch screen controller IC", or the like. Meanwhile, according to an embodiment, in an electronic device in which the touch sensor IC 425 is not included, the processor 460 may perform a role of the touch sensor IC 425. According to an embodiment, the touch sensor IC 425 and the processor 460 may be implemented with one element (e.g., one-chip).

According to an embodiment, the force sensor 430 may detect pressure (or force) by an external object (e.g., a finger or an electronic pen). According to an embodiment, in the force sensor 430, a physical quantity (e.g., capacitance) between the transmitting terminal Tx (e.g., the first electrode 341 of FIG. 3) and the receiving terminal Rx (e.g., the second electrode 342 of FIG. 3) may vary due to the touch.

According to an embodiment, the force sensor IC 435 may sense a variation in a physical quantity (e.g., capacitance or the like) in the force sensor 430 and may calculate pressure "Z" applied by a user touch based on the variation in the physical quantity. The pressure "Z" may be provided to the processor 460 together with the location (X, Y) at which the touch is made. The force sensor IC 435 may also calculate intensity, speed (variation in the intensity), and/or direction of the pressure "Z". The intensity, speed (variation in the intensity), and/or direction of the pressure "Z" may be provided to the processor 460 together with the pressure "Z" and the location (X, Y).

According to an embodiment, the force sensor IC 435 may be referred to as a "force touch controller", a "force sensor IC", a "pressure panel IC", or the like. Also, according to various embodiments, the force sensor IC 435 may be implemented with one element (e.g., one-chip) together with the touch sensor IC 425.

According to an embodiment, the haptic actuator 440 may provide a user with a haptic feedback (e.g., vibration) in response to a control command of the processor 460. For example, when a touch input (e.g., including a touch, a hovering, and a force touch) is received from the user, the haptic actuator 440 may provide the user with a haptic feedback.

According to an embodiment, the memory 450 may store commands or data associated with an operation of an element included in the electronic device 401. For example, the memory 450 may store at least one application program that includes a user interface configured to display one or more items in a display. Also, for example, the memory 450 may store instructions that, when executed, cause the processor 460 to perform various operations (e.g., refer to FIGS. 5 and 9A-9C) disclosed in this specification.

According to an embodiment, for example, the processor 460 may be electrically connected with the elements 410 to 450 included in the electronic device 401 and may execute operations or data processing associated with control and/or communication of the elements 410 to 450 included in the electronic device 401.

According to an embodiment, the processor 460 may launch (or execute) an application program (or application) that displays a user interface in the display 410. The processor 460 may display one or more items in a user interface displayed in the display 410 in response to the launching of the application. According to an embodiment, the processor 460 may receive first data (data including the location coordinates (X, Y) of the touch) generated from the touch sensor 420 and may receive second data (data including the pressure "Z" of the touch) generated from the force sensor 430.

According to an embodiment, the processor 460 may activate at least part of the force sensor 430 while the display 410 is turned off or while the display 410 operates in the low-power mode. Alternatively, the processor 460 may at least partially activate the force sensor 430 while the display 410 is turned off. For example, the processor 460 may activate the whole or part of the force sensor 430 in the following cases: the case where an element such as the display 410 or the like is turned off, the case where the electronic device 401 is in a standby state in which the electronic device 401 is in the low-power mode, and the case where the electronic device 401 is in an awake state. Meanwhile, the processor 460 may at least partially deactivate the touch sensor 420 while the electronic device 401 is in the standby state. According to the above description, power consumption of the touch sensor 420 may decrease, and an abnormal operation of the touch sensor 420 may decrease.

According to an embodiment, the processor 460 may activate at least part of the force sensor 430 if a specified condition is satisfied while the display 410 is turned off or while the display 410 operates in the low-power mode. For example, the processor 460 may activate the force sensor 430 after a specified time or until a specified time after the display 410 is turned off or operates in the low-power mode. For another example, the processor 460 may activate the force sensor 430 if the use of the user is sensed by a gyro sensor, a proximity sensor, or the like. For another example, the processor 460 may activate the force sensor 430 during a specific time period if the following event occurs: the event that a temperature is lower than a specified value, the event that a touch is sensed through a touch panel, the event that the electronic device 401 approaches another external device, or the event that a stylus mounted in the electronic device 401 is pulled out from the electronic device 401. For another example, the processor 460 may activate the force sensor 430 while an application (e.g., a music player) that performs an operation in a standby state is executed.

According to an embodiment, the processor 460 may deactivate at least part of the force sensor 430 if a specified condition is satisfied while the display 410 is turned off or while the display 410 operates in the low-power mode. For example, the processor 460 may deactivate the force sensor 430 if the following event is sensed by using a proximity sensor, an illumination sensor, an acceleration sensor, and/or a gyro sensor: the event that the electronic device 401 is placed in a pocket, the event that the electronic device 401 is put in a bag, or the event that the electronic device 401 is overturned. For another example, the processor 460 may deactivate the force sensor 430 in the case where the electronic device 401 is connected with an external device (e.g., connected with a desktop).

According to an embodiment, the processor 460 may activate only a specified area of the force sensor 430 while the display 410 is turned off or while the display 410 operates in the low-power mode. For example, the processor 460 may activate a specified area of the force sensor 430 (e.g., a lower middle area of the force sensor 430) to reduce power consumption in the standby state. Alternatively, in the case where the force sensor 430 is implemented with a set of two or more sensors, the processor 460 may activate some of the two or more sensors.

As described above, it may be possible to sense pressure by using the force sensor 430 during a standby state of the electronic device 401 by activating or deactivating the force sensor 430. For example, the processor 460 may receive data associated with pressure on the display 410 by an external object from the force sensor 430 while the display 410 is turned off or while the display 410 operates in the low-power mode.

According to an embodiment, the processor 460 may determine whether the pressure is larger than or equal to a specified level, based on the data associated with the pressure. If it is determined that the pressure is larger than or equal to the specified level, the processor 460 may perform a function while the display 410 is not fully turned on. For example, the processor 460 may perform a function if there is sensed pressure of which the size is larger than the specified level. In this case, the processor 460 may turn on part of the display 410. The processor 460 may determine a function to be performed as follows, based on at least one of a location at which pressure is sensed, the intensity of the pressure, the number of points at which the pressure is sensed, a speed of the pressure, a direction of the pressure, and duration of the pressure. For example, the processor 460 may wake up the electronic device 401 if pressure is sensed at a location corresponding to the lower middle of the display 410. The processor 460 may control a volume of a speaker of the electronic device 401 if pressure is sensed at a location corresponding to the upper left of the display 410. If pressure is sensed at a location adjacent to hardware such as an ear jack, a USB port, or the like, the processor 460 may perform a function associated with the adjacent hardware. If pressure of specified intensity or larger is sensed, the processor 460 may control the electronic device 401 to allow the electronic device 401 to enter an emergency mode. The processor 460 may perform different functions depending on the number of points at which pressure is sensed at the same time.

An embodiment is illustrated in FIG. 4 as the force sensor 430 provides the processor 460 with data associated with the pressure "Z". However, embodiments of the present disclosure may not be limited thereto. For example, in the case where the force sensor 430 is implemented with a set of two or more sensors, the processor 460 may sense a location to which pressure is applied, based on a location of a sensor, of which capacitance varies, from among the two or more sensors. For example, in the case where the force sensor 430 is implemented with a set of six sensors arranged in the form of a 3-by-2 array, the processor 460 may determine a location to which pressure is applied, based on a variation in capacitance of each of the six sensors and a location at which each of the six sensors is disposed. That is, the processor 460 may determine a location to which pressure is applied, without using the touch sensor 430. The processor 460 may sense a location, to which pressure is applied, by using the touch sensor 420 by activating the touch sensor 420 if pressure is sensed by the force sensor 430.

According to an embodiment, the processor 460 may perform a first function if touch pressure of a first level is sensed in the force sensor 430. The processor 460 may determine the first function based on at least one of a location at which the pressure of the first level is sensed, the intensity of the pressure, the number of points at which the pressure is sensed, a speed of the pressure, a direction of the pressure, and duration of the pressure and may perform the determined first function. The pressure of the first level may mean pressure of the intensity within a specified range.

According to an embodiment, the processor 460 may perform a second function associated with the first function if touch pressure of a second level is sensed in the force sensor 430 during the execution of the first function. The processor 460 may determine the second function based on at least one of a location at which the pressure of the second level is sensed, the intensity of the pressure, the number of points at which the pressure is sensed, a speed of the pressure, a direction of the pressure, and duration of the pressure. The pressure of the second level may mean pressure of the intensity within a specified range. The intensity of the pressure of the second level may be larger or smaller than the intensity of the pressure of the first level. The processor 460 may execute various functions by pressure being a one-directional input by performing the second function associated with the first function being executed if pressure is sensed during the execution of the first function. Also, convenience of an input may be improved by executing another function, which is associated with a function being executed, depending on the size of pressure applied to the electronic device 401 after one touch on the electronic device 401.

The above-described operation of the processor 460 is, but is not limited to, an example. For example, an operation of a processor described in other parts of this specification should be understood as an operation of the processor 460. Also, in this specification, at least some of operations described as an operation of an "electronic device" should be understood as an operation of the processor 460.

In an embodiment, an electronic device may excessively consume power to continuously activate a force sensor. Below, a method for reducing power consumed according to an operation of the force sensor of the electronic device will be described with reference to FIG. 5.

Figure 5:
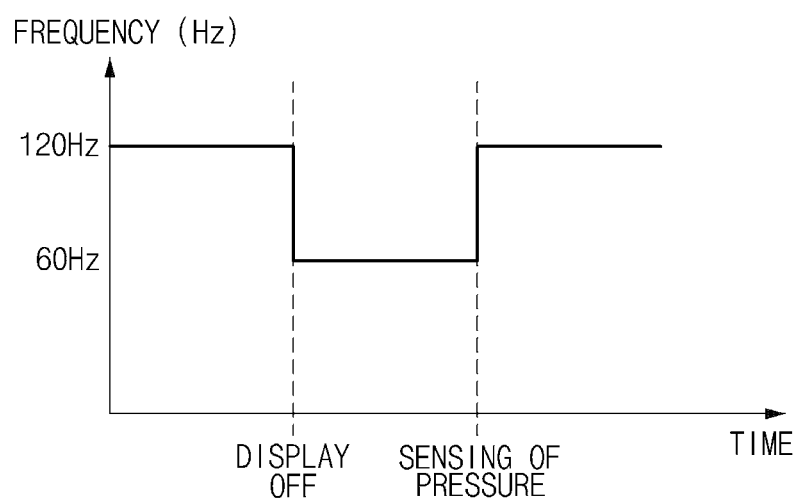
FIG. 5 is a graph illustrating a time-dependent frequency of an electrical signal supplied to a force sensor included in the electronic device according to an embodiment.

FIG. 5 is a graph illustrating a time-dependent frequency of an electrical signal supplied to a force sensor included in an electronic device according to an embodiment.

Referring to FIG. 5, an electronic device according to an embodiment may supply an electrical signal for sensing pressure to a force sensor. For example, the electronic device may supply an electrical signal of 120 Hz to the force sensor in an awake state in which a display is turned on. Power consumption of the force sensor may increase as a frequency of the electrical signal supplied to the force sensor become higher.

According to an embodiment, if the display is turned off or operates in the low-power mode, the electronic device may decrease the frequency of the electrical signal supplied to the force sensor. For example, the electronic device may decrease the frequency of the electrical signal supplied to the force sensor to 60 Hz in a standby state in which the display is turned off or operates in the low-power mode. Power consumption of the force sensor may decrease by decreasing the frequency of the electrical signal supplied to the force sensor.

According to an embodiment, since pressure is able to be additionally sensed later if pressure is sensed by the force sensor, to improve sensitivity of the force sensor, the electronic device may change the frequency of the electrical signal supplied to the force sensor to be the same as the awake state. For example, the electronic device may increase the frequency of the electrical signal to 120 Hz during a specified time after pressure is sensed by the force sensor.

As described above, power consumption of the force sensor may decrease by dynamically adjusting the frequency of the electrical signal supplied to the force sensor, and simultaneously, the sensitivity of the force sensor may be maintained. The electronic device according to an embodiment may activate at least part of the force sensor while the display is turned off or operates in the low-power mode. For example, in the case of receiving an input by using a touch sensor, with the display turned off, an abnormal operation that the user does not intend may be performed. An unintended abnormal operation may decrease upon receiving an input during a standby state of the electronic device by receiving an input through the force sensor while the display is turned off or operates in the low-power mode.

The electronic device according to an embodiment may not include a physical key for expansion of the display or improvement of a design of the electronic device. User experience that is similar to the use of the physical key may be provided to the user by receiving an input from the user by using the force sensor during a standby state of the electronic device. Below, operations executable by an electronic device according to an embodiment will be described with reference to FIGS. 6A to 8C. A display of an electronic device is turned off before pressure is sensed. However, embodiments of the present disclosure may not be limited thereto. For example, the electronic device according to various embodiments may operate in the low-power mode in a standby state. According to various embodiments, if pressure of specified intensity in a specified area is sensed, the electronic device may execute a function corresponding to the specified area and the specified intensity.

Figures 6A, 6B, 6C:
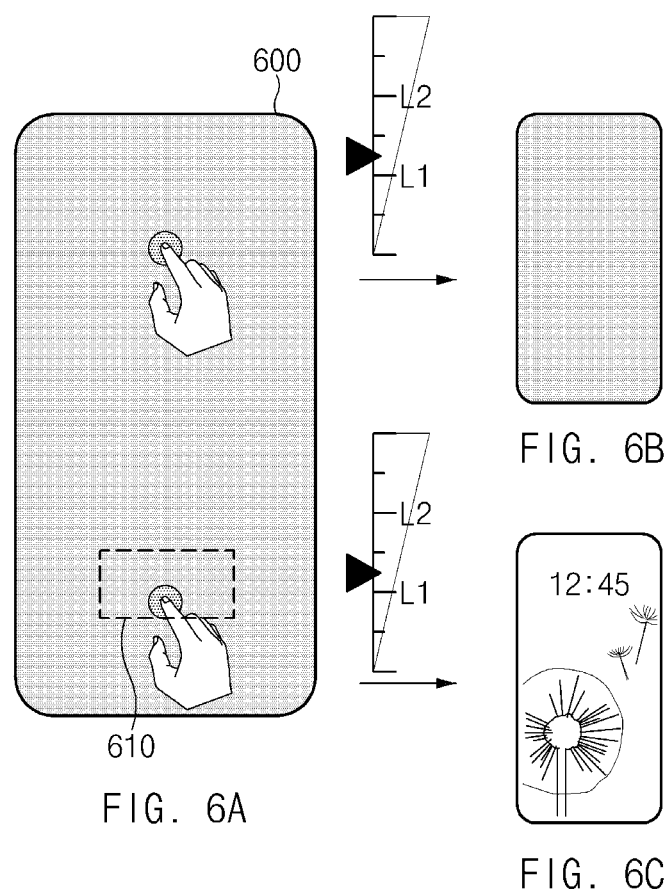
FIGS. 6A-6C are views for describing an example operation of the electronic device according to an embodiment.

FIGS. 6A-6C are views for describing an example operation of an electronic device according to an embodiment.

An electronic device 600 according to an embodiment may activate a partial area 610 of a force sensor while a display is turned off, while the display operates in the low-power mode, or while the electronic device 600 is in the standby state. The electronic device 600 may sense pressure by a touch of the user through the area 610 in which the force sensor is activated in the standby state. The electronic device 600 may fail to sense pressure applied to an outer area of the area 610. For example, in the case where pressure is applied to the outer area of the area 610 in which the force sensor is activated, the electronic device 600 may be maintained in the standby state.

According to an embodiment, if pressure is applied within the area 610, the electronic device 600 may sense the pressure by using the force sensor. For example, the area 610 may be a lower middle area of a front surface of the electronic device 600 being an area in which a home button of a general electronic device is disposed. According to an embodiment, a touch sensor of the electronic device may be deactivated if the display is turned off or operates in the low-power mode. The electronic device 600 may activate the touch sensor if pressure of specified intensity or larger is sensed in the area 610. The electronic device 600 may obtain coordinates of a touched point by using the touch sensor. The electronic device 600 may obtain a point, to which pressure is applied, by using the force sensor without using the touch sensor. According to an embodiment, the electronic device 600 may perform a specified function if pressure having intensity of a specified range is sensed in the area 610. For example, the electronic device 600 may turn on the display in response to sensing of pressure "Z" (>L1) of a first level and may display a lock screen in the display.

According to an embodiment, the electronic device 600 may include a fingerprint sensor under the area 610. For example, if the pressure "Z" (>L1) of the first level is sensed in the area 610, the electronic device 600 may turn on the fingerprint sensor. If a fingerprint sensed by the fingerprint sensor coincides with a fingerprint stored in advance, the electronic device 600 may turn on the display and may display a home screen in the display.

Figures 7A, 7B:
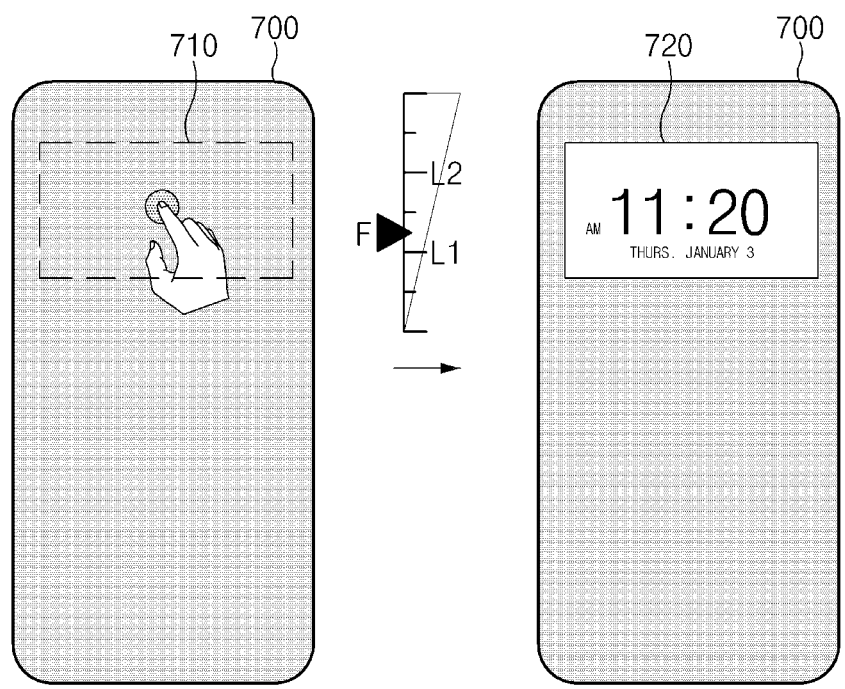
FIGS. 7A and 7B are views for describing an example operation of the electronic device according to an embodiment.

FIGS. 7A and 7B are views for describing an example operation of an electronic device according to an embodiment.

An electronic device 700 according to an embodiment may sense pressure applied in a partial area 710 while a display is turned off or while the display operates in the low-power mode.

For example, when pressure is sensed in the area 710, the electronic device 700 may determine a point, at which the pressure is sensed, by using a touch sensor or may determine the point, at which the pressure is sensed, by using only a force sensor without the touch sensor. The electronic device 700 may obtain a point, to which pressure is applied, by using the touch sensor and the force sensor. For example, the touch sensor of the electronic device may be deactivated if the display is turned off. The electronic device 700 may activate the touch sensor if pressure of specified intensity or larger is sensed in the area 710. The electronic device 700 may obtain coordinates of a touched point by using the touch sensor.

According to various embodiments, if pressure "Z" (>L1) of a first level is sensed in the area 710, the electronic device 700 may perform a function corresponding to the area 710.

For example, if pressure is sensed in the area 710, the electronic device 700 may display information in the area 720. The electronic device 700 may activate only part, which corresponds to the area 720, of the display and may display the remaining part other than the part corresponding to the area 720 with a black color. The area 710 and the area 720 are similar to each other. However, embodiments of the present disclosure may not be limited thereto. For example, the area 710 and the area 720 may be placed at different portions. The area 720 corresponding to the area 710 and/or information displayed in the area 720 may be set in advance, may be specified by the user, or may be automatically set by the electronic device 700. For example, the electronic device 700 may display time information in the area 720. If pressure is continuously sensed in the area 720, the electronic device 700 may perform an operation associated with the time information.

For another example, if pressure is sensed in a lower right area, which corresponds to a location at which a call button is displayed, of a front surface of the electronic device 700, the electronic device 700 may display a key pad for inputting a phone number or may attempt to call with a specified phone number. For another example, the electronic device may execute a camera application if an input is sensed in an area set in advance. The electronic device 700 may execute different applications depending on the intensities of pressure. If the camera application is executed, the electronic device 700 may display a preview in at least part of the display. If pressure is sensed in an area in which the preview is displayed, the electronic device 700 may select one camera of a front camera and a rear camera depending on the intensity of pressure and may capture an image by using the selected camera.

FIGS. 8A-8C are views for describing an example operation of an electronic device according to an embodiment.

An electronic device 800 may include a speaker and may control a volume of the speaker. The electronic device 800 may sense pressure, which is applied to an area at which a volume key of a general electronic device is disposed, while a display is turned off or while the display operates in the low-power mode. For another example, the electronic device 800 may operate the display in the low-power mode and may display a volume key in the display.

For example, if pressure "Z" (L1<Z<L2) of a first level is sensed in an upper left area 810 of a front surface of the electronic device 800, the electronic device 800 may gradually increase a volume of the speaker. If the pressure "Z" (L1<Z<L2) of the first level is sensed in an area 820 lower than the area 810, the electronic device 810 may gradually decrease a volume of the speaker. If pressure "Z" (>L2) of a second level is sensed in the area 820, the electronic device 800 may enter a mute mode. For another example, if pressure is sensed at two points in the area 820, the electronic device 800 may enter the mute mode.

According to an embodiment, the electronic device 800 may calculate intensity, speed, and/or direction of pressure. The electronic device 800 may adjust a volume based on the speed of the pressure (or a variation in the pressure per hour). For example, the electronic device may increase or decrease a volume more quickly as the speed at which the pressure is applied becomes higher. The electronic device 800 may adjust a volume based on the direction of the pressure. For example, the electronic device 800 may increase if pressure is applied toward an upper portion of the electronic device 800 and may decrease if pressure is applied toward a lower portion of the electronic device 800.

The electronic device described with reference to FIGS. 5 to 8C may execute various functions immediately in a standby state by using the force sensor and may reduce power consumption of the force sensor in the standby state by activating the force sensor at least partially or adjusting a frequency of an electrical signal supplied to the force sensor.

In another embodiment, the electronic device may sense two or more pressure correlated to each other in the standby state and may perform more various functions based on each sensing result. Below, operations executable by an electronic device according to an embodiment will be described with reference to FIGS. 9A to 14D. A display of an electronic device is turned off before pressure is sensed. However, embodiments of the present disclosure may not be limited thereto. For example, the electronic device according to various embodiments may operate in the low-power mode in a standby state. According to various embodiments, the electronic device may perform a first function if pressure of a first level is sensed and may perform a second function associated with the first function if pressure of a second level is sensed. The pressure of the first level and the pressure of the second level may be applied to the electronic device by one touch.

FIGS. 9A-9C are views for describing an example operation of an electronic device according to an embodiment.

If an external object is touched at a first point 910, an electronic device 900 according to an embodiment may sense pressure at the first point 910. The pressure sensed at the first point 910 may be pressure (L1<Z<L2) of a first level.

According to an embodiment, the electronic device 900 may display information in a partial area 930, which corresponds to the first point 910, of a display in response to sensing the pressure. For example, the electronic device 900 may activate only the area 930 of the display being a peripheral area of the first point 910 at which the pressure is sensed. The electronic device 900 may display information only in the area 930 and may display a black screen in the remaining area of the display. For example, the electronic device 900 may display, in the area 930, a home screen corresponding to the area 930. Information displayed in the area 930 may be maintained while pressure is applied at the first point 910, during a specified time after the pressure is applied, or while a hovering input is recognized.

According to an embodiment, in the case where the external object is dragged from the first point 910 to a second point 920, the electronic device 900 may display information in an area 940 from the first point 910 to the second point 920. For another example, if pressure "Z" (>L2) of the second level dragged from the first point 910, at which the pressure of the first level is sensed, is sensed at the second point 920, the electronic device 900 may display information in the partial area 940 of the display, which corresponds to the second point 920 at which the pressure of the second level is sensed. For example, the electronic device 900 may display, in the area 940, a home screen corresponding to the area 940. For example, in the case where a point at which pressure is sensed moves while pressure of specified size or larger is maintained, the area in which the information is displayed may widen by the drag. After a specified time elapses, a left-side portion, which corresponds to the first point 910, of the area 940 may be turned off or may be changed to a black screen. The user may rapidly verify part of a screen of the electronic device 900 through the drag.

The intensity of the pressure of the first level and the intensity of the pressure of the second level are included in different ranges. However, embodiments of the present disclosure may not be limited thereto. For example, the intensity of the pressure of the first level and the intensity of the pressure of the second level may be included in the same range.

FIGS. 10A-10C are views for describing an example operation of an electronic device according to an embodiment.

An electronic device 1000 may sense pressure (L1<Z<L2) of a first level at a point 1010 of an upper left area of a front surface of the electronic device 1000. The electronic device 1000 may display a user interface 1020, which is associated with hardware mapped onto the point at which the pressure of the first level is sensed, in at least part of the display. For example, the electronic device 1000 may display the user interface 1020, which includes a gauge for adjusting a volume of a speaker in response to sensing the pressure, in the at least part of the display. To receive a user input while pressure is sensed in the upper left point 1010 or during a specified time after the pressure is sensed, the electronic device 1000 may display the user interface 1020 on part of the display. The electronic device 1000 may adjust a volume of the speaker based on a touch on the user interface 1020.

According to various embodiments, if pressure "Z" (>L2) of a second level is sensed, the electronic device 1000 may perform a function associated with the displayed user interface 1020. For example, if the pressure of the second level is sensed at the upper left point 1010, the electronic device 1000 may decrease a volume of the speaker.

According to an embodiment, even though pressure is sensed at the same point, the electronic device 1000 may execute different functions depending on a state of the electronic device 1000. For example, if pressure is sensed at the upper left point 1010 while a music player is executed, the electronic device 1000 may adjust a volume of the speaker; if pressure is sensed at the upper left point 1010 while no application is executed, the electronic device 1000 may adjust a volume of a phone ring.

According to an embodiment, the electronic device 1000 may calculate intensity, speed, and/or direction of pressure. The electronic device 1000 may adjust a volume based on the speed of the pressure. For example, the electronic device may increase or decrease a volume more quickly as the speed at which the pressure is applied becomes higher. The electronic device 1000 may adjust a volume based on the direction of the pressure. For example, the electronic device 1000 may increase if pressure is applied toward an upper portion of the electronic device 1000 and may decrease if pressure is applied toward a lower portion of the electronic device 1000.

The intensity of the pressure of the first level and the intensity of the pressure of the second level are included in different ranges. However, embodiments of the present disclosure may not be limited thereto. For example, the intensity of the pressure of the first level and the intensity of the pressure of the second level may be included in the same range. Also, the pressure of the first level and the pressure of the second level are sensed at the same point 1010. However, embodiments of the present disclosure may not be limited thereto. For example, the pressure of the first level and the pressure of the second level may be sensed at different points.

Figures 11A, 11B, 11C:
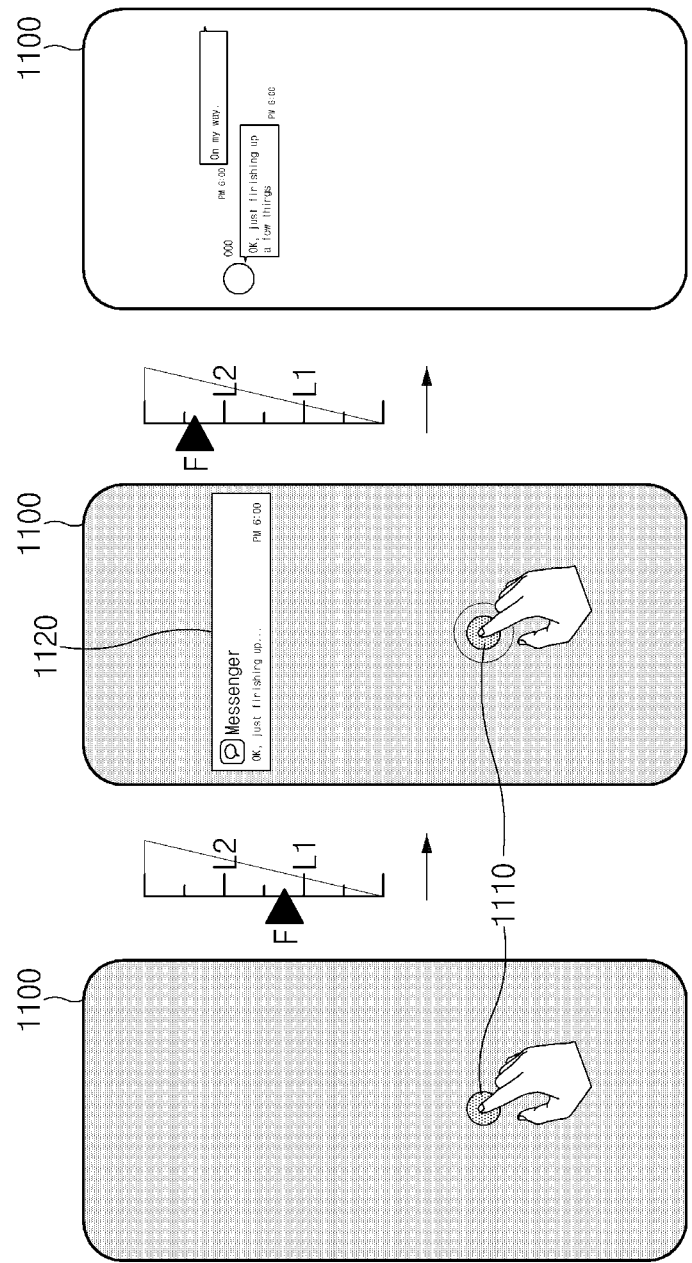
FIGS. 11A-11C are views for describing an example operation of the electronic device according to an embodiment.
Figure 12D:
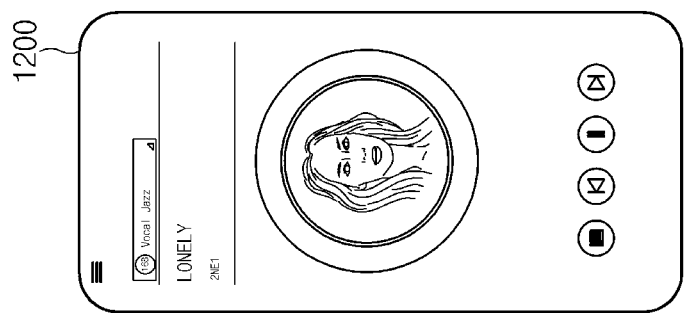
FIGS. 12A-12D are views for describing an example operation of the electronic device according to an embodiment.
Figure 12C:
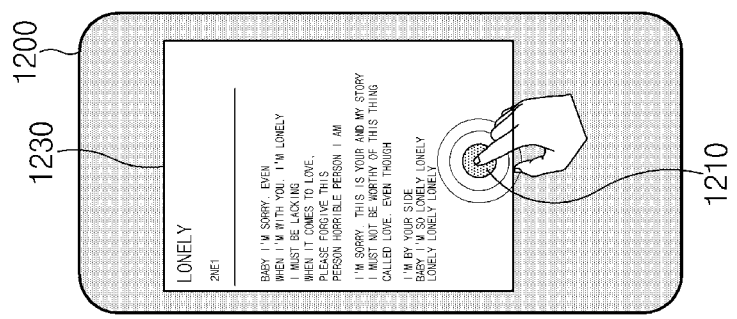
Figure 12B:
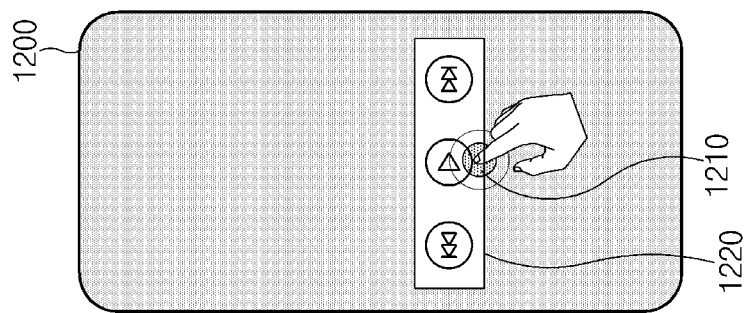
Figure 12A:
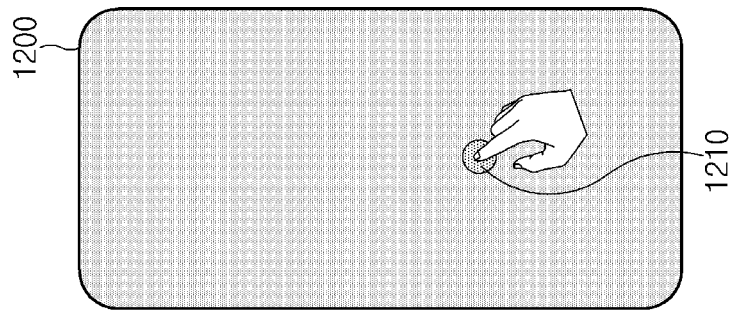

FIGS. 11A-11C are views for describing an example operation of an electronic device according to an embodiment.

According to an embodiment, while a display is turned off or while the display operates in the low-power mode, an electronic device 1100 may generate a notification based at least part on at least one internal event or a signal from an external device. For example, the electronic device 1100 may generate a notification indicating the arrival of a message through a messenger. The electronic device 1100 may display a message associated with the notification on part of the display. For example, the electronic device 1100 may activate a force sensor after generating the notification.

The electronic device 1100 may sense pressure (L1<Z<L2) of a first level at a point 1110 at which a notification is generated in the electronic device 1100. The electronic device 1100 may display information associated with the notification in at least part of the display in response to sensing the pressure. For example, the electronic device 1100 may display information associated with the notification only in the case where the pressure of the first level is sensed within a specified time after the notification is generated. For example, the electronic device 1100 may display a preview of a received message in the area 1120. The electronic device 1100 may activate only part, which corresponds to the area 1120, of the display and may display the remaining part other than the part corresponding to the area 1120 with a black color. For example, the electronic device 1100 may determine duration during which information associated with the notification is displayed, based on the intensity of pressure. The electronic device 1100 may receive a user input through the area 1120.

According to an embodiment, in the case where user's gaze to the display is not sensed at a point in time when pressure is sensed, the electronic device 1100 may output information associated with the notification by voice. For example, the electronic device 1100 may output the received message by voice. If pressure is additionally sensed while voice is output, the electronic device 1100 may stop the output of the voice and may display a preview of the message.

According to an embodiment, if pressure "Z" (>L2) of a second level is sensed after the information associated with the notification is displayed, the electronic device 1100 may execute an application associated with the notification. For example, if pressure of the second level is sensed, the electronic device 1100 may display detail information associated with a preview displayed in the area 1120. The pressure of the first level and the pressure of the second level may be input by one touch. For example, the electronic device 1100 may execute a messenger application if pressure of the second level is sensed at the point 1110 after the preview of the received message is displayed. The electronic device 1100 may execute the messenger application and may automatically display a chat room associated with the received message.

According to an embodiment, the electronic device 1100 may sense pressure while the message associated with the notification is displayed after the notification is first generated. For example, the electronic device 1100 may receive data associated with pressure on the display by an external object from a force sensor while the message is displayed. The electronic device 1100 may determine whether pressure is larger than or equal to a selected level, based on the received data. If the pressure is larger than or equal to the selected level, the electronic device 1100 may perform a function associated with the notification. For example, the electronic device 1100 may display a chat room of the messenger in the case where the pressure is larger than or equal to the selected level.

The intensity of the pressure of the first level and the intensity of the pressure of the second level are included in different ranges. However, embodiments of the present disclosure may not be limited thereto. For example, the intensity of the pressure of the first level and the intensity of the pressure of the second level may be included in the same range. Also, the pressure of the first level and the pressure of the second level are sensed at the same point 1110. However, embodiments of the present disclosure may not be limited thereto. For example, the pressure of the first level and the pressure of the second level may be sensed at different points. Also, pressure of the second level is applied after pressure of the first level is applied. However, embodiments of the present disclosure may not be limited thereto. For example, if pressure of the second level is sensed, the electronic device may execute an application associated with the notification; if pressure of the first level is next sensed, the electronic device may display a preview associated with the notification.

FIGS. 12A-12D are views for describing an example operation of an electronic device according to an embodiment.

An electronic device 1200 according to an embodiment may execute an application program at least partially while at least part of a display is turned off or while at least part of the display operates in the low-power mode. For example, the application program may include a music player application program. The electronic device 1200 may activate a force sensor while the application program is executed.

The electronic device 1200 may receive data associated with pressure on the display by an external object from the force sensor while the application program is executed. The electronic device 1200 may sense pressure (L1<Z<L2) of a first level while an application is executed in the electronic device 1200. For example, the electronic device 1200 may sense pressure of the first level at a point 1210 while a music player is executed.

For example, the electronic device 1200 may determine whether the pressure is larger than or equal to a selected level, based on data. In the case where the pressure is larger than or equal to the selected level, the electronic device 1200 may execute a function associated with the application program. The function may be associated with at least one of a sound control or a music play. For example, the electronic device 1200 may display a user interface associated with the application in at least part of the display. For example, the electronic device 1200 may display a control panel for controlling a music player. The control panel may include virtual objects for executing functions such as play, fast forward, and/or rewind.

According to an embodiment, the electronic device 1200 may sense pressure (L1<Z<L2) of a second level at the point 1210 after displaying a user interface in an area 1220. If pressure of the second level is sensed, the electronic device 1200 may display another user interface associated with an application in an area 1230. For example, if pressure of the second level is sensed while music is played, the electronic device 1200 may display information (e.g., lyrics of the music being played) associated with the music being played in the area 1230. The electronic device 1200 may operate the display in the low-power mode to reduce power consumption and may display a user interface in the display that operates in the low-power mode. In the case where the user inputs a command for stopping the display of the user interface, the electronic device 1200 may stop the display of the user interface.

According to an embodiment, the electronic device 1200 may sense pressure "Z" (>L3) of a third level at the point 1210 after displaying a user interface in the area 1230. If pressure of the third level is sensed, the electronic device 1200 may display an execution screen of the application in the display. For example, the electronic device 1200 may display the execution screen of the music application in the whole area of the display.

The intensity of the pressure of the first level, the intensity of the pressure of the second level, and the intensity of the pressure of the third level are included in different ranges. However, embodiments of the present disclosure may not be limited thereto. For example, the intensity of the pressure of the first level, the intensity of the pressure of the second level, and the intensity of the pressure of the third level may be included in the same range. Also, the pressure of the first level, the pressure of the second level, and the pressure of the third level are sensed at the same point 1210. However, embodiments of the present disclosure may not be limited thereto. For example, the pressure of the first level, the pressure of the second level, and the pressure of the third level may be sensed at different points.

According to an embodiment, an electronic device may generate a notification while an application is executed. For example, the electronic device may generate a notification associated with a messenger while a music player is executed. The electronic device may selectively perform a function associated with an application being executed or a function associated with a notification, based on a time when pressure is sensed, the intensity of the pressure, and/or an area at which the pressure is sensed. For example, if pressure is sensed within a specified time after a notification is generated, the electronic device may perform the function associated with the notification; if pressure is sensed after the specified time after the notification is generated, the electronic device may perform the function associated with the application. For another example, the electronic device may perform the function associated with the notification if pressure of the first level is sensed and may perform the function associated with the application being executed if pressure of the second level is sensed. For another example, the electronic device may perform the function associated with the notification if pressure is sensed on an upper portion of a front surface of the electronic device and may perform the function associated with the application being executed if pressure is sensed on a lower portion of the front surface of the electronic device.

According to various embodiments, the electronic device may execute a function associated with a state of the electronic device, based on another state of the electronic device as well as a generated notification or an application being executed. According to an embodiment, in the case where the electronic device is connected with an external device, the electronic device may execute a function associated with the external device. For example, in the case where the electronic device is connected with a television (TV), if pressure is sensed, the electronic device may display information about the TV and may display a control panel for controlling the TV. According to an embodiment, the electronic device may execute a function associated with information obtained by the electronic device. For example, in the case where a location of the electronic device is near a bus stop, the electronic device may activate NFC for use of a transportation card function if pressure is sensed. The electronic device may display relevant information in the display that operates in the low-power mode. For another example, in the case where the user senses danger, the electronic device may enter an emergency mode if pressure is sensed. As described above, if pressure is sensed, the electronic device may perform a function associated with a variety of state information of the electronic device.

Figure 13C:
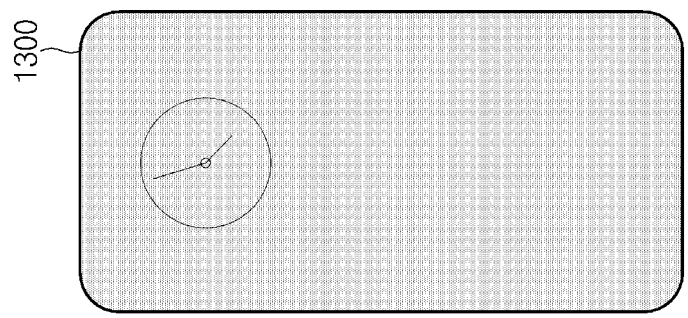
FIGS. 13A-13C are views for describing an example operation of the electronic device according to an embodiment.
Figure 13B:
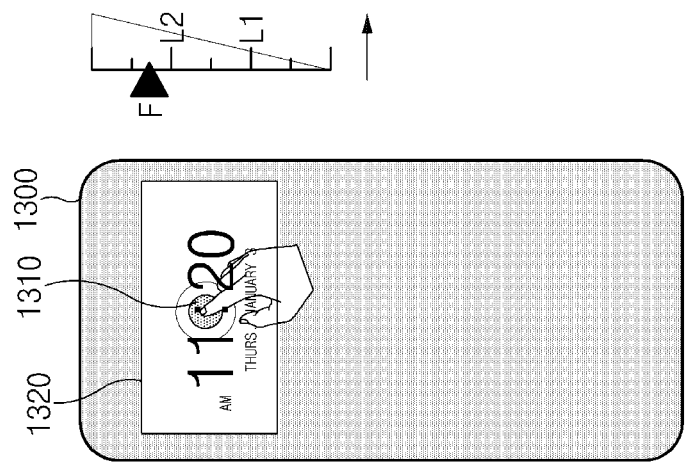
Figure 13A:
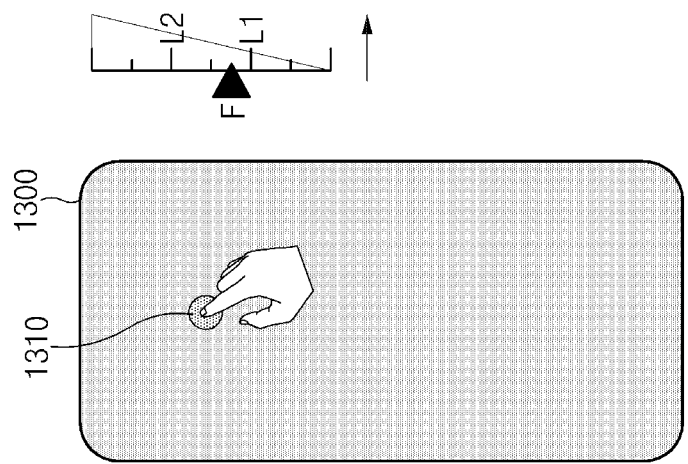
Figure 14D:
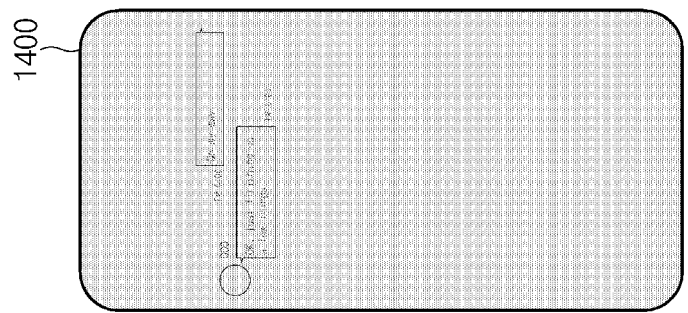
FIGS. 14A-14D are views for describing an example operation of the electronic device according to an embodiment.
Figure 14C:
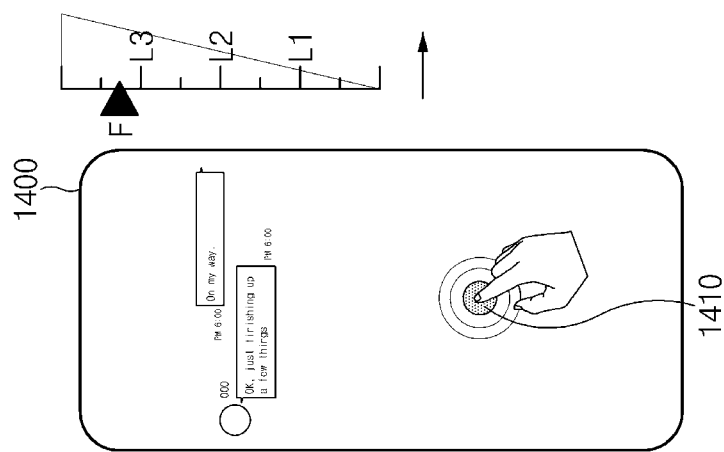
Figure 14B:
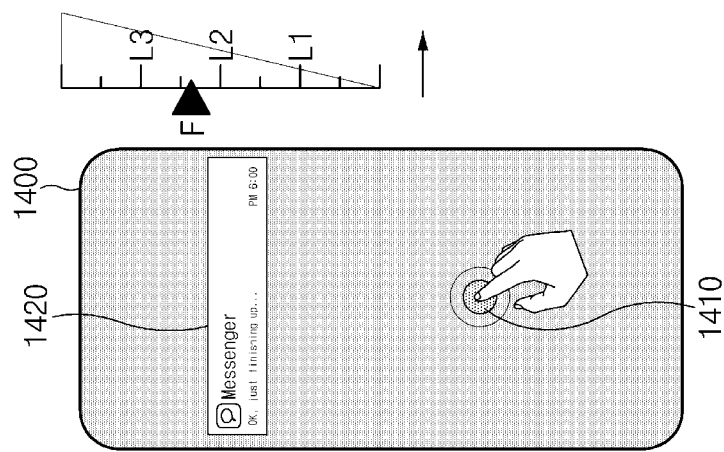
Figure 14A:
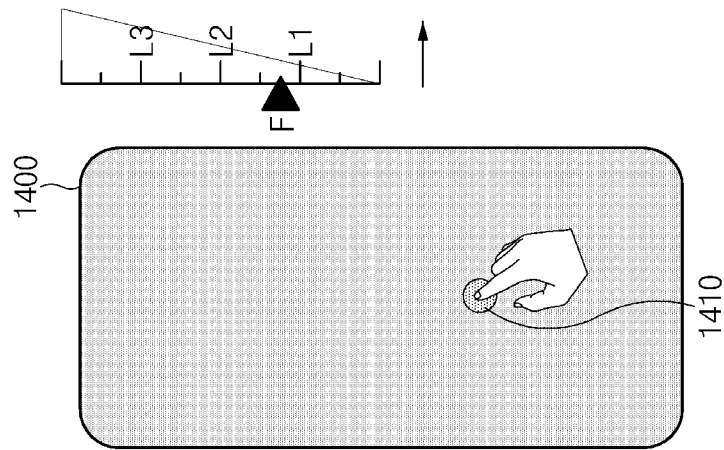

FIGS. 13A-13C are views for describing an example operation of an electronic device according to an embodiment.

If pressure (L1<Z<L2) of a first level is sensed at a point 1310 while a display is turned off or while the display operates in the low-power mode, an electronic device 1300 may execute a function mapped onto the point 1310 in a partial area 1320 of the display. For example, the electronic device 1300 may display time information in the area 1320. The electronic device 1300 may sense additional pressure in the area 1320 after the time information is displayed.

For example, if pressure "Z" (>L2) of a second level is sensed while the time information is displayed in the area 1320, the electronic device 1300 may display a user interface associated with the executed function in the display that operates in the low-power mode. For example, if pressure of the second level is sensed, the electronic device may fix displayed information in the display, which operates in the low-power mode, in response to sensing the pressure of the first level. For example, the electronic device 1300 may display information in response to sensing the pressure of the first level and may always display the displayed information in the display, which operates in the low-power mode, even in the standby state in response to sensing the pressure of the second level.

The time information that is displayed in the area 1320 in response to the pressure of the first level and the time information that is displayed in the display of the low-power mode in response to the pressure of the second level may be formed of different formats. The time information that is displayed in response to the pressure of the second level may be simplified compared with the time information that is displayed in response to the pressure of the first level. For another example, the electronic device 1300 may display a screen displayed in the area 1320 in the display of the low-power mode without changing a format for displaying time information.

The intensity of the pressure of the first level and the intensity of the pressure of the second level are included in different ranges. However, embodiments of the present disclosure may not be limited thereto. For example, the intensity of the pressure of the first level and the intensity of the pressure of the second level may be included in the same range. Also, the pressure of the first level and the pressure of the second level are sensed at the same point 1310. However, embodiments of the present disclosure may not be limited thereto. For example, the pressure of the first level and the pressure of the second level may be sensed at different points.

FIGS. 14A-14D are views for describing an example operation of an electronic device according to an embodiment.

If pressure (L1<Z<L2) of a first level is sensed at a point 1410 while a display is turned off or while the display operates in the low-power mode, an electronic device 1400 may execute a function associated with a notification in a partial area 1420 of the display. For example, the electronic device 1400 may display a preview of a received message in the area 1420. The electronic device 1400 may sense additional pressure after the preview is displayed in the area

1420. The point 1410 may be any point on the display of the electronic device 1400 or may be one point in a specified area. For example, the point 1410 may be any point on the display of the electronic device 1400 during a specified time from a time when a notification is generated.

For example, if pressure (L2<Z<L3) of a second level is sensed while the preview is displayed in the area 1420, the electronic device 1400 may execute an application associated with the notification. For example, if pressure of the second level is sensed, the electronic device 1400 may execute a messenger application associated with a received message. The electronic device 1400 may execute the messenger application and may automatically display a chat room associated with the received message.

According to an embodiment, if pressure "Z" (>L3) of a third level is sensed at the point 1410 after the chat room is displayed (or if pressure is sensed at two more points), the electronic device 1400 may display an execution screen (e.g., a chat room screen) of the messenger application in the display operating in the low-power mode. The displayed chat room may be displayed while the conversation is being held or during a specified time.

The intensity of the pressure of the first level, the intensity of the pressure of the second level, and the intensity of the pressure of the third level are included in different ranges. However, embodiments of the present disclosure may not be limited thereto. For example, the intensity of the pressure of the first level, the intensity of the pressure of the second level, and the intensity of the pressure of the third level may be included in the same range. Also, the pressure of the first level, the pressure of the second level, and the pressure of the third level are sensed at the same point 1410. However, embodiments of the present disclosure may not be limited thereto. For example, the pressure of the first level, the pressure of the second level, and the pressure of the third level may be sensed at different points. Also, the pressure of the first level, the pressure of the second level, and the pressure of the third level are sequentially applied. However, embodiments of the present disclosure may not be limited thereto. For example, the electronic device may sense the pressure of the first level, the pressure of the second level, and the pressure of the third level randomly or may execute functions, which respectively correspond to the pressure of the first level, the pressure of the second level, and the pressure of the third level, depending on according to a sensed order.

According to an embodiment, if pressure is sensed in a standby state, the electronic device may activate another element included in the electronic device. For example, if pressure is sensed in the standby state, the electronic device may activate at least part of the display or a touch sensor. Below, the activation of the display or the touch sensor will be described with reference to FIG. 15.

Figure 15:
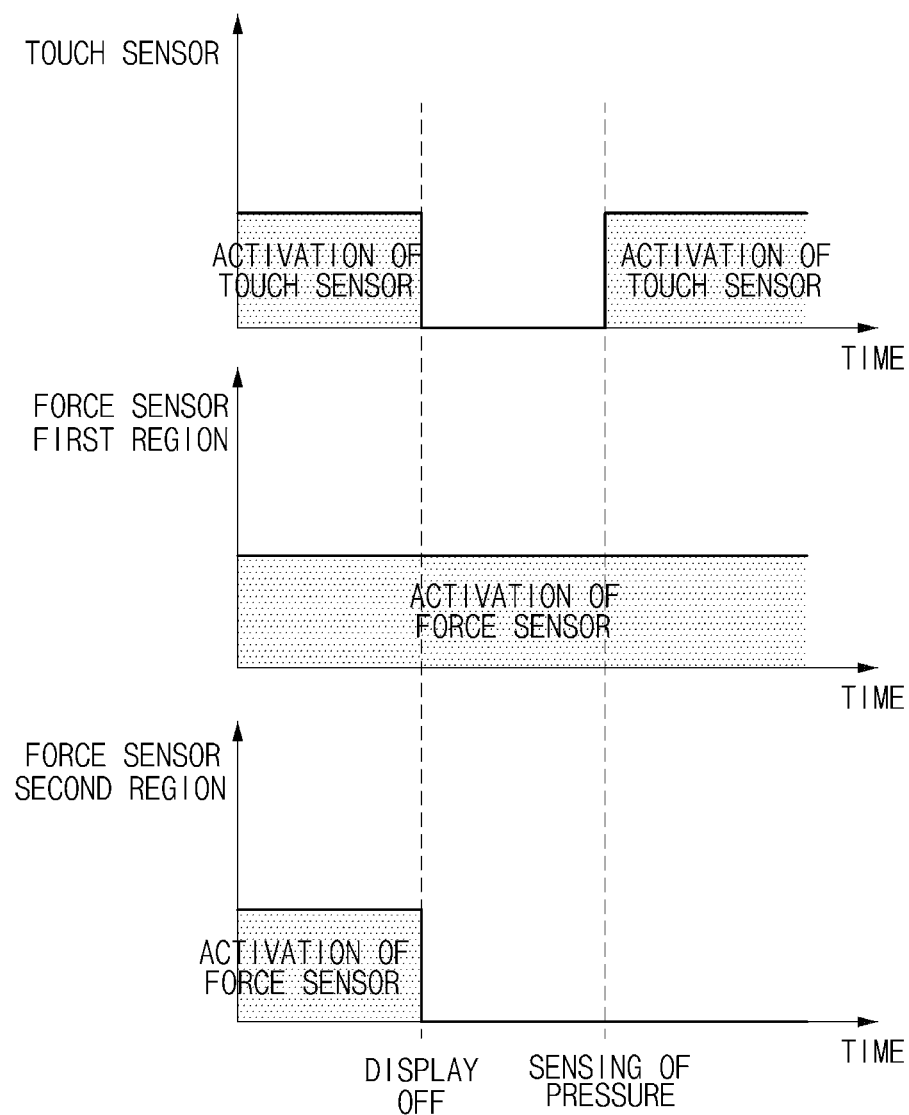
FIG. 15 is a graph illustrating how a touch sensor and a force sensor included in the electronic device according to an embodiment are activated over time.

FIG. 15 is a graph illustrating how a touch sensor and a force sensor included in an electronic device according to an embodiment are activated over time.

Referring to FIG. 15, an electronic device may activate a touch sensor if pressure (e.g., pressure of a first level or pressure of a second level) is sensed in at least part of a force sensor. For example, the electronic device may activate the touch sensor and/or the force sensor in an awake state. In the case where a display is turned off and the electronic device is in a standby state, the electronic device may deactivate the touch sensor. The electronic device may activate the force sensor even while the electronic device is in the standby state. According to an embodiment, if pressure is sensed by the force sensor, the electronic device may activate the touch sensor. The electronic device may obtain coordinate information of a touched point by using the touch sensor.

According to an embodiment, during deactivation of the touch sensor, the electronic device may obtain the coordinate information of the touched point by using the force sensor. In this case, the electronic device may not activate the touch sensor even though pressure is sensed. According to an embodiment, the electronic device may obtain the coordinate information of the touched point by using the force sensor and the touch sensor.

According to an embodiment, in the case where the display is turned off and the electronic device is in the standby state, the electronic device may activate a first area of the force sensor and may deactivate a second area of the force sensor. The electronic device may reduce power consumption of the force sensor by activating an area for sensing pressure and deactivating the remaining area.

An embodiment is illustrated in FIG. 15 as the electronic device activates the touch sensor in response to sensing pressure. However, embodiments of the present disclosure may not be limited thereto. For example, the electronic device may activate the display if pressure is sensed. If pressure is sensed in the standby state, the electronic device may display a screen in the display of the low-power mode.

Figures 16A, 16B:
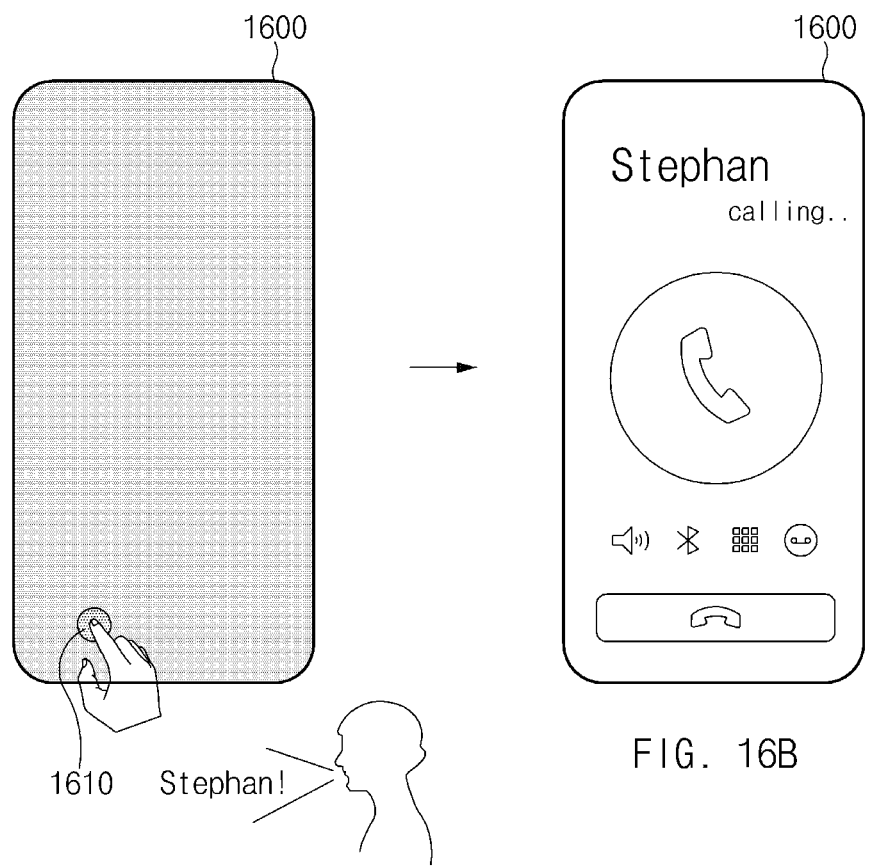
FIGS. 16A and 16B are views for describing an example operation of the electronic device according to an embodiment.

FIGS. 16A and 16B are views for describing an example operation of an electronic device according to an embodiment.

According to an embodiment, an electronic device 1600 may further include a microphone that is configured to receive sound from the outside (i.e., an exterior of the electronic device 1600). The electronic device 1600 may execute an application for voice recognition while pressure is sensed; if voice is received through the microphone while pressure is sensed, the electronic device 1600 may execute a function corresponding to the voice.

If pressure is sensed at a point 1610 while a display is turned off or while the display operates in the low-power mode, the electronic device 1600 may execute the application for voice recognition. A display of the electronic device is turned off before pressure is sensed. However, embodiments of the present disclosure may not be limited thereto. For example, the display of the electronic device according to various embodiments may operate in the low-power mode in a standby state. For example, the electronic device 1600 may execute the application for voice recognition in response to sensing pressure, without a voice command for executing a voice recognition application, such as "Hi, Galaxy". The electronic device 1600 may maintain execution of the voice recognition application while pressure is sensed. The electronic device 1600 may execute the voice recognition application without turning on the display.

According to an embodiment, the electronic device 1600 may receive a voice from the outside by using the microphone. The electronic device 1600 may receive a voice after an application is executed or may receive a voice while pressure is sensed. The electronic device 1600 may perform a function corresponding to the received voice and the point 1610 at which pressure is sensed. For example, in the case where a voice "Stephan" is received and pressure is sensed at the point 1610 where a call button is displayed in an awake state, the electronic device 1600 may attempt to call to "Stephan" stored in contacts of the electronic device 1600. Different functions may be executed according to points at which pressure is respectively sensed.

For example, the electronic device 1600 may set a domain of voice recognition depending on a point at which pressure is sensed or depending on a function being executed when pressure is sensed. As described above, if pressure is sensed at the point 1610 adjacent to the call button, the electronic device 1600 may set the domain of voice recognition to a call; if a name stored in the contacts is recognized, the electronic device 1600 may attempt to call with a phone number corresponding to the recognized name. For another example, if pressure is sensed while weather information is displayed, the electronic device 1600 may set the domain of voice recognition to weather, and if a place name is recognized, the electronic device 1600 may display weather information corresponding to the recognized place name.

As described above, voice recognition may be efficiently performed in the standby state by using the force sensor as a switch for voice recognition while the display is turned off or while the display operates in the low-power mode.

Figure 17:
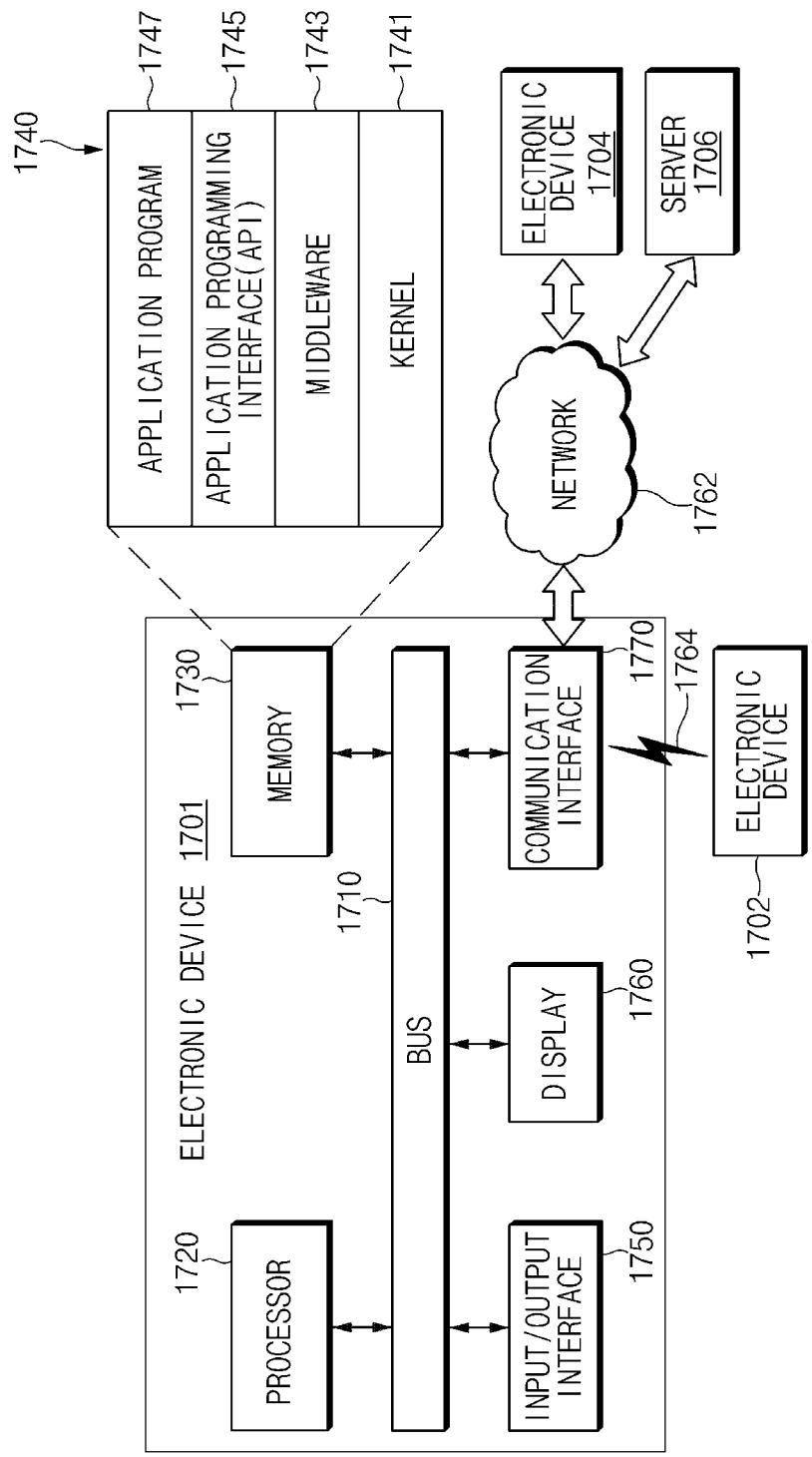
FIG. 17 illustrates the electronic device in a network environment according to various embodiments.

FIG. 17 illustrates an electronic device in a network environment system, according to various embodiments.

Referring to FIG. 17, according to various embodiments, an electronic device 1701, 1702, or 1704, or a server 1706 may be connected each other over a network 1762 or a short range communication 1764. The electronic device 1701 may include a bus 1710, a processor 1720, a memory 1730, an input/output interface 1750, a display 1760, and a communication interface 1770. According to an embodiment, the electronic device 1701 may not include at least one of the above-described elements or may further include other element(s).

For example, the bus 1710 may interconnect the above-described elements 1710 to 1770 and may include a circuit for conveying communications (e.g., a control message and/or data) among the above-described elements.

The processor 1720 may include one or more of a central processing unit (CPU), an application processor (AP), or a communication processor (CP). For example, the processor 1720 may perform an arithmetic operation or data processing associated with control and/or communication of at least other elements of the electronic device 1701.

The memory 1730 may include a volatile and/or nonvolatile memory. For example, the memory 1730 may store instructions or data associated with at least one other element(s) of the electronic device 1701. According to an embodiment, the memory 1730 may store software and/or a program 1740. The program 1740 may include, for example, a kernel 1741, a middleware 1743, an application programming interface (API) 1745, and/or an application program (or "an application") 1747. At least a part of the kernel 1741, the middleware 1743, or the API 1745 may be referred to as an "operating system (OS)".

For example, the kernel 1741 may control or manage system resources (e.g., the bus 1710, the processor 1720, the memory 1730, and the like) that are used to execute operations or functions of other programs (e.g., the middleware 1743, the API 1745, and the application program 1747). Furthermore, the kernel 1741 may provide an interface that allows the middleware 1743, the API 1745, or the application program 1747 to access discrete elements of the electronic device 1701 so as to control or manage system resources.

The middleware 1743 may perform, for example, a mediation role such that the API 1745 or the application program 1747 communicates with the kernel 1741 to exchange data.

Furthermore, the middleware 1743 may process task requests received from the application program 1747 according to a priority. For example, the middleware 1743 may assign the priority, which makes it possible to use a system resource (e.g., the bus 1710, the processor 1720, the memory 1730, or the like) of the electronic device 1701, to at least one of the application program 1747. For example, the middleware 1743 may process the one or more task requests according to the priority assigned to the at least one, which makes it possible to perform scheduling or load balancing on the one or more task requests.

The API 1745 may be, for example, an interface through which the application program 1747 controls a function provided by the kernel 1741 or the middleware 1743, and may include, for example, at least one interface or function (e.g., an instruction) for a file control, a window control, image processing, a character control, or the like.

The input/output interface 1750 may play a role, for example, an interface which transmits an instruction or data input from a user or another external device, to other element(s) of the electronic device 1701. Furthermore, the input/output interface 1750 may output an instruction or data, received from other element(s) of the electronic device 1701, to a user or another external device.

The display 1760 may include, for example, a liquid crystal display (LCD), a light-emitting diode (LED) display, an organic LED (OLED) display, a microelectromechanical systems (MEMS) display, or an electronic paper display. The display 1760 may display, for example, various contents (e.g., a text, an image, a video, an icon, a symbol, and the like) to a user. The display 1760 may include a touch screen and may receive, for example, a touch, gesture, proximity, or hovering input using an electronic pen or a part of a user's body.

For example, the communication interface 1770 may establish communication between the electronic device 1701 and an external device (e.g., the first external electronic device 1702, the second external electronic device 1704, or the server 1706). For example, the communication interface 1770 may be connected to the network 1762 over wireless communication or wired communication to communicate with the external device (e.g., the second external electronic device 1704 or the server 1706).

The wireless communication may use at least one of, for example, long-term evolution (LTE), LTE Advanced (LTE-A), Code Division Multiple Access (CDMA), Wideband CDMA (WCDMA), Universal Mobile Telecommunications System (UMTS), Wireless Broadband (WiBro), Global System for Mobile Communications (GSM), or the like, as cellular communication protocol. Furthermore, the wireless communication may include, for example, the short range communication 1764. The short range communication 1764 may include at least one of wireless fidelity (Wi-Fi), Bluetooth, near field communication (NFC), magnetic stripe transmission (MST), a global navigation satellite system (GNSS), or the like.

The MST may generate a pulse in response to transmission data using an electromagnetic signal, and the pulse may generate a magnetic field signal. The electronic device 1701 may transfer the magnetic field signal to point of sale (POS), and the POS may detect the magnetic field signal using a MST reader. The POS may recover the data by converting the detected magnetic field signal to an electrical signal.

The GNSS may include at least one of, for example, a global positioning system (GPS), a global navigation satellite system (Glonass), a Beidou navigation satellite system (hereinafter referred to as "Beidou"), or an European global satellite-based navigation system (hereinafter referred to as "Galileo") based on an available region, a bandwidth, or the like. Hereinafter, in this disclosure, "GPS" and "GNSS" may be interchangeably used. The wired communication may include at least one of, for example, a universal serial bus (USB), a high definition multimedia interface (HDMI), a recommended standard-232 (RS-232), a plain old telephone service (POTS), or the like. The network 1762 may include at least one of telecommunications networks, for example, a computer network (e.g., LAN or WAN), an Internet, or a telephone network.

Each of the first and second external electronic devices 1702 and 1704 may be a device of which the type is different from or the same as that of the electronic device 1701. According to an embodiment, the server 1706 may include a group of one or more servers. According to various embodiments, all or a portion of operations that the electronic device 1701 will perform may be executed by another or plural electronic devices (e.g., the electronic device 1702 or 1704 or the server 1706). According to an embodiment, in the case where the electronic device 1701 executes any function or service automatically or in response to a request, the electronic device 1701 may not perform the function or the service internally, but, alternatively additionally, it may request at least a portion of a function associated with the electronic device 1701 at another device (e.g., the electronic device 1702 or 1704 or the server 1706). The other electronic device (e.g., the electronic device 1702 or 1704 or the server 1706) may execute the requested function or additional function and may transmit the execution result to the electronic device 1701. The electronic device 1701 may provide the requested function or service using the received result or may additionally process the received result to provide the requested function or service. To this end, for example, cloud computing, distributed computing, or client-server computing may be used.

Figure 18:
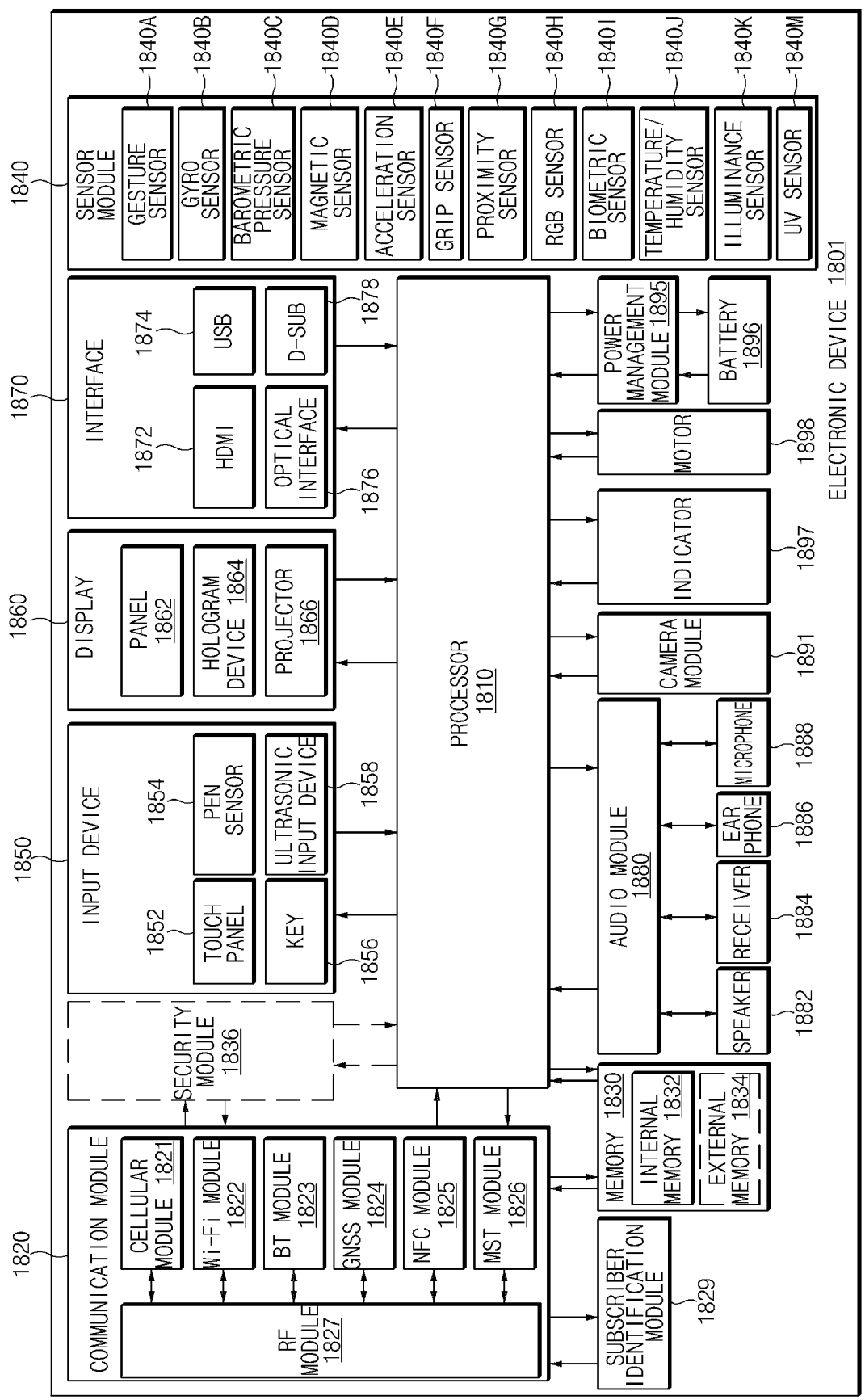
FIG. 18 is a block diagram of the electronic device according to various embodiments.

FIG. 18 illustrates a block diagram of an electronic device, according to various embodiments.

Referring to FIG. 18, an electronic device 1801 may include, for example, all or a part of the electronic device 1701 illustrated in FIG. 17. The electronic device 1801 may include one or more processors (e.g., an application processor (AP)) 1810, a communication module 1820, a subscriber identification module 1829, a memory 1830, a sensor module 1840, an input device 1850, a display 1860, an interface 1870, an audio module 1880, a camera module 1891, a power management module 1895, a battery 1896, an indicator 1897, and a motor 1898.

The processor 1810 may drive, for example, an operating system (OS) or an application to control a plurality of hardware or software elements connected to the processor 1810 and may process and compute a variety of data. For example, the processor 1810 may be implemented with a System on Chip (SoC). According to an embodiment, the processor 1810 may further include a graphic processing unit (GPU) and/or an image signal processor. The processor 1810 may include at least a part (e.g., a cellular module 1821) of elements illustrated in FIG. 18. The processor 1810 may load an instruction or data, which is received from at least one of other elements (e.g., a nonvolatile memory), into a volatile memory and process the loaded instruction or data. The processor 1810 may store a variety of data in the nonvolatile memory.

The communication module 1820 may be configured the same as or similar to the communication interface 1770 of FIG. 17. The communication module 1820 may include the cellular module 1821, a Wi-Fi module 1822, a Bluetooth (BT) module 1823, a GNSS module 1824 (e.g., a GPS module, a Glonass module, a Beidou module, or a Galileo module), a near field communication (NFC) module 1825, a MST module 1826 and a radio frequency (RF) module 1827.

The cellular module 1821 may provide, for example, voice communication, video communication, a character service, an Internet service, or the like over a communication network. According to an embodiment, the cellular module 1821 may perform discrimination and authentication of the electronic device 1801 within a communication network by using the subscriber identification module (e.g., a SIM card) 1829. According to an embodiment, the cellular module 1821 may perform at least a portion of functions that the processor 1810 provides. According to an embodiment, the cellular module 1821 may include a communication processor (CP).

Each of the Wi-Fi module 1822, the BT module 1823, the GNSS module 1824, the NFC module 1825, or the MST module 1826 may include a processor for processing data exchanged through a corresponding module, for example. According to an embodiment, at least a part (e.g., two or more) of the cellular module 1821, the Wi-Fi module 1822, the BT module 1823, the GNSS module 1824, the NFC module 1825, and the MST module 1826 may be included within one Integrated Circuit (IC) or an IC package.

For example, the RF module 1827 may transmit and receive a communication signal (e.g., an RF signal). For example, the RF module 1827 may include a transceiver, a power amplifier module (PAM), a frequency filter, a low noise amplifier (LNA), an antenna, or the like. According to another embodiment, at least one of the cellular module 1821, the Wi-Fi module 1822, the BT module 1823, the GNSS module 1824, the NFC module 1825, or the MST module 1826 may transmit and receive an RF signal through a separate RF module.

The subscriber identification module 1829 may include, for example, a card and/or embedded SIM that includes a subscriber identification module and may include unique identity information (e.g., integrated circuit card identifier (ICCID)) or subscriber information (e.g., international mobile subscriber identity (IMSI)).

The memory 1830 (e.g., the memory 1730) may include an internal memory 1832 or an external memory 1834. For example, the internal memory 1832 may include at least one of a volatile memory (e.g., a dynamic random access memory (DRAM), a static RAM (SRAM), a synchronous DRAM (SDRAM), or the like), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory), or the like), a hard drive, or a solid state drive (SSD).

The external memory 1834 may further include a flash drive such as compact flash (CF), secure digital (SD), micro secure digital (Micro-SD), mini secure digital (Mini-SD), extreme digital (xD), a multimedia card (MMC), a memory stick, or the like. The external memory 1834 may be operatively and/or physically connected to the electronic device 1801 through various interfaces.

A security module 1836 may be a module that includes a storage space of which a security level is higher than that of the memory 1830 and may be a circuit that guarantees safe data storage and a protected execution environment. The security module 1836 may be implemented with a separate circuit and may include a separate processor. For example, the security module 1836 may be in a smart chip or a secure digital (SD) card, which is removable, or may include an embedded secure element (eSE) embedded in a fixed chip of the electronic device 1801. Furthermore, the security module 1836 may operate based on an operating system (OS) that is different from the OS of the electronic device 1801. For example, the security module 1836 may operate based on java card open platform (JCOP) OS.

The sensor module 1840 may measure, for example, a physical quantity or may detect an operation state of the electronic device 1801. The sensor module 1840 may convert the measured or detected information to an electric signal. For example, the sensor module 1840 may include at least one of a gesture sensor 1840A, a gyro sensor 1840B, a barometric force sensor 1840C, a magnetic sensor 1840D, an acceleration sensor 1840E, a grip sensor 1840F, the proximity sensor 1840G, a color sensor 1840H (e.g., red, green, blue (RGB) sensor), a biometric sensor 1840I, a temperature/humidity sensor 1840J, an illuminance sensor 1840K, or an UV sensor 1840M. Although not illustrated, additionally or generally, the sensor module 1840 may further include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 1840 may further include a control circuit for controlling at least one or more sensors included therein. According to an embodiment, the electronic device 1801 may further include a processor that is a part of the processor 1810 or independent of the processor 1810 and is configured to control the sensor module 1840. The processor may control the sensor module 1840 while the processor 1810 remains at a sleep state.

The input device 1850 may include, for example, a touch panel 1852, a (digital) pen sensor 1854, a key 1856, or an ultrasonic input unit 1858. For example, the touch panel 1852 may use at least one of capacitive, resistive, infrared and ultrasonic detecting methods. Also, the touch panel 1852 may further include a control circuit. The touch panel 1852 may further include a tactile layer to provide a tactile reaction to a user.

The (digital) pen sensor 1854 may be, for example, a part of a touch panel or may include an additional sheet for recognition. The key 1856 may include, for example, a physical button, an optical key, a keypad, or the like. The ultrasonic input device 1858 may detect (or sense) an ultrasonic signal, which is generated from an input device, through a microphone (e.g., a microphone 1888) and may check data corresponding to the detected ultrasonic signal.

The display 1860 (e.g., the display 1760) may include a panel 1862, a hologram device 1864, or a projector 1866. The panel 1862 may be the same as or similar to the display 1760 illustrated in FIG. 17. The panel 1862 may be implemented, for example, to be flexible, transparent or wearable. The panel 1862 and the touch panel 1852 may be integrated into a single module. The hologram device 1864 may display a stereoscopic image in a space using a light interference phenomenon. The projector 1866 may project light onto a screen so as to display an image. For example, the screen may be arranged in the inside or the outside of the electronic device 1801. According to an embodiment, the display 1860 may further include a control circuit for controlling the panel 1862, the hologram device 1864, or the projector 1866.

The interface 1870 may include, for example, a high-definition multimedia interface (HDMI) 1872, a universal serial bus (USB) 1874, an optical interface 1876, or a D-subminiature (D-sub) 1878. The interface 1870 may be included, for example, in the communication interface 1770 illustrated in FIG. 17. Additionally or generally, the interface 1870 may include, for example, a mobile high definition link (MHL) interface, a SD card/multi-media card (MMC) interface, or an infrared data association (IrDA) standard interface.

The audio module 1880 may convert a sound and an electric signal in dual directions. At least a part of the audio module 1880 may be included, for example, in the input/output interface 1750 illustrated in FIG. 17. The audio module 1880 may process, for example, sound information that is input or output through a speaker 1882, a receiver 1884, an earphone 1886, or the microphone 1888.

For example, the camera module 1891 may shoot a still image or a video. According to an embodiment, the camera module 1891 may include at least one or more image sensors (e.g., a front sensor or a rear sensor), a lens, an image signal processor (ISP), or a flash (e.g., an LED or a xenon lamp).

The power management module 1895 may manage, for example, power of the electronic device 1801. According to an embodiment, a power management integrated circuit (PMIC), a charger IC, or a battery or fuel gauge may be included in the power management module 1895. The PMIC may have a wired charging method and/or a wireless charging method. The wireless charging method may include, for example, a magnetic resonance method, a magnetic induction method or an electromagnetic method and may further include an additional circuit, for example, a coil loop, a resonant circuit, or a rectifier, and the like. The battery gauge may measure, for example, a remaining capacity of the battery 1896 and a voltage, current or temperature thereof while the battery is charged. The battery 1896 may include, for example, a rechargeable battery and/or a solar battery.

The indicator 1897 may display a specific state of the electronic device 1801 or a part thereof (e.g., the processor 1810), such as a booting state, a message state, a charging state, and the like. The motor 1898 may convert an electrical signal into a mechanical vibration and may generate the following effects: vibration, haptic, and the like. Although not illustrated, a processing device (e.g., a GPU) for supporting a mobile TV may be included in the electronic device 1801. The processing device for supporting the mobile TV may process media data according to the standards of digital multimedia broadcasting (DMB), digital video broadcasting (DVB), MediaFlo™, or the like.

Each of the above-mentioned elements of the electronic device according to various embodiments of the present disclosure may be configured with one or more components, and the names of the elements may be changed according to the type of the electronic device. In various embodiments, the electronic device may include at least one of the above-mentioned elements, and some elements may be omitted or other additional elements may be added. Furthermore, some of the elements of the electronic device according to various embodiments may be combined with each other so as to form one entity, so that the functions of the elements may be performed in the same manner as before the combination.

Figure 19:
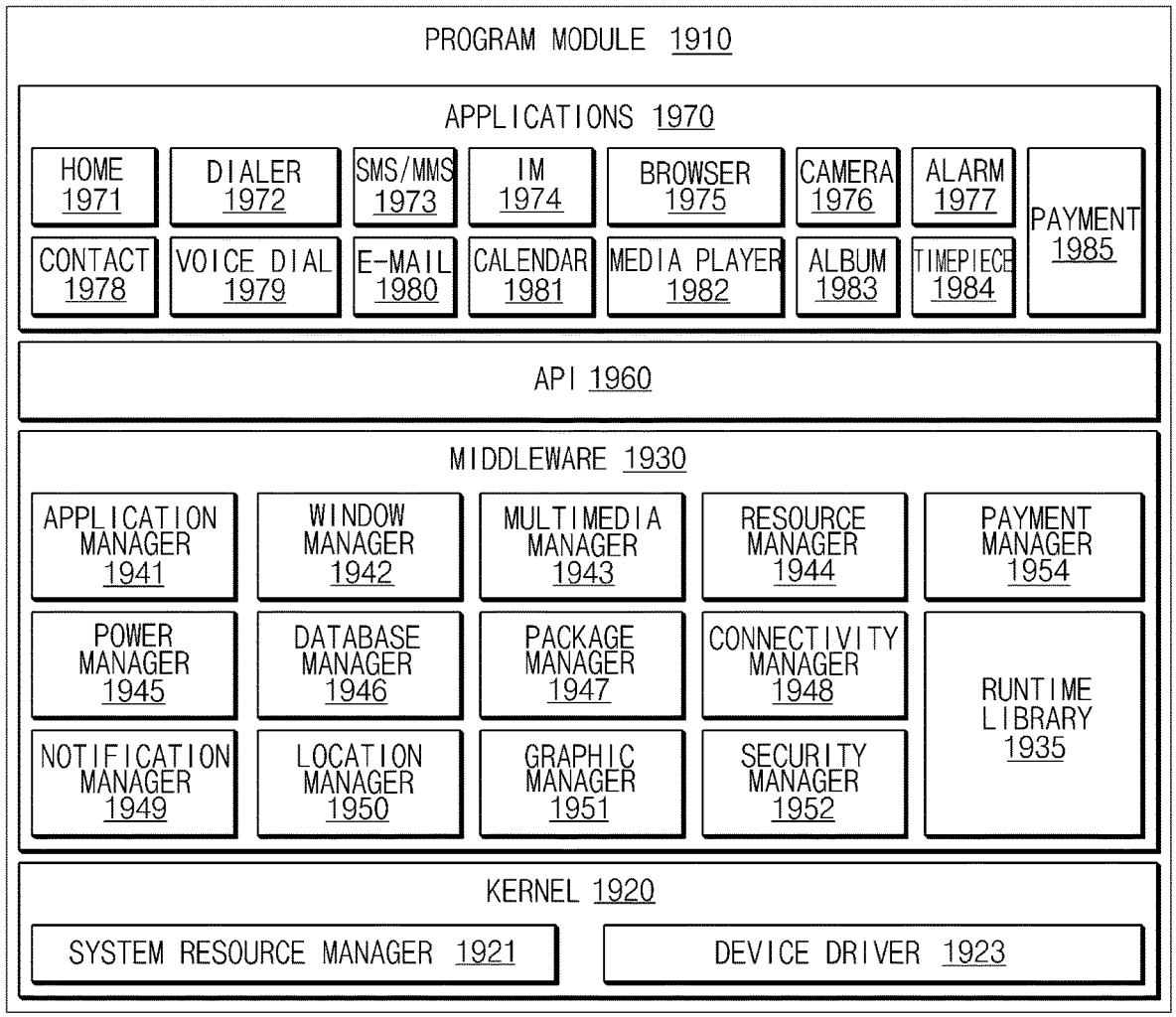
FIG. 19 is a block diagram of a program module according to various embodiments.

FIG. 19 illustrates a block diagram of a program module, according to various embodiments.

According to an embodiment, a program module 1910 (e.g., the program 1740) may include an operating system (OS) to control resources associated with an electronic device (e.g., the electronic device 1701), and/or diverse applications (e.g., the application program 1747) driven on the OS. The OS may be, for example, Android, iOS, Windows, Symbian, Tizen, or Bada.

The program module 1910 may include a kernel 1920, a middleware 1930, an application programming interface (API) 1960, and/or an application 1970. At least a portion of the program module 1910 may be preloaded on an electronic device or may be downloadable from an external electronic device (e.g., the electronic device 1702 or 1704, the server 1706, or the like).

The kernel 1920 (e.g., the kernel 1741) may include, for example, a system resource manager 1921 or a device driver 1923. The system resource manager 1921 may perform control, allocation, or retrieval of system resources. According to an embodiment, the system resource manager 1921 may include a process managing unit, a memory managing unit, or a file system managing unit. The device driver 1923 may include, for example, a display driver, a camera driver, a Bluetooth driver, a shared memory driver, a USB driver, a keypad driver, a Wi-Fi driver, an audio driver, or an inter-process communication (IPC) driver.

The middleware 1930 may provide, for example, a function that the application 1970 needs in common, or may provide diverse functions to the application 1970 through the API 1960 to allow the application 1970 to efficiently use limited system resources of the electronic device. According to an embodiment, the middleware 1930 (e.g., the middleware 1743) may include at least one of a runtime library 1935, an application manager 1941, a window manager 1942, a multimedia manager 1943, a resource manager 1944, a power manager 1945, a database manager 1946, a package manager 1947, a connectivity manager 1948, a notification manager 1949, a location manager 1950, a graphic manager 1951, a security manager 1952, or a payment manager 1954.

The runtime library 1935 may include, for example, a library module that is used by a compiler to add a new function through a programming language while the application 1970 is being executed. The runtime library 1935 may perform input/output management, memory management, or capacities about arithmetic functions.

The application manager 1941 may manage, for example, a life cycle of at least one application of the application 1970. The window manager 1942 may manage a graphic user interface (GUI) resource that is used in a screen. The multimedia manager 1943 may identify a format necessary for playing diverse media files, and may perform encoding or decoding of media files by using a codec suitable for the format. The resource manager 1944 may manage resources such as a storage space, memory, or source code of at least one application of the application 1970. The power manager 1945 may operate, for example, with a basic input/output system (BIOS) to manage a battery or power, and may provide power information for an operation of an electronic device. The database manager 1946 may generate, search for, or modify the database that is to be used in at least one application of the application 1970. The package manager 1947 may install or update an application that is distributed in the form of package file.

The connectivity manager 1948 may manage, for example, wireless connection such as Wi-Fi or Bluetooth. The notification manager 1949 may display or notify an event such as arrival message, appointment, or proximity notification in a mode that does not disturb a user. The location manager 1950 may manage location information about an electronic device. The graphic manager 1951 may manage a graphic effect that is provided to a user, or manage a user interface relevant thereto. The security manager 1952 may provide a general security function necessary for system security, user authentication, or the like. According to an embodiment, in the case where an electronic device (e.g., the electronic device 1701) includes a telephony function, the middleware 1930 may further include a telephony manager for managing a voice or video call function of the electronic device.

The middleware 1930 may include a middleware module that combines diverse functions of the above-described elements. The middleware 1930 may provide a module specialized to each OS kind to provide differentiated functions. Additionally, the middleware 1930 may dynamically remove a part of the preexisting elements or may add new elements thereto.

The API 1960 (e.g., the API 1745) may be, for example, a set of programming functions and may be provided with a configuration that is variable depending on an OS. For example, in the case where an OS is the android or the iOS, it may provide one API set per platform. In the case where an OS is the tizen, it may provide two or more API sets per platform.

The application 1970 (e.g., the application program 1747) may include, for example, one or more applications capable of providing functions for a home 1971, a dialer 1972, an SMS/MMS 1973, an instant message (IM) 1974, a browser 1975, a camera 1976, an alarm 1977, a contact 1978, a voice dial 1979, an e-mail 1980, a calendar 1981, a media player 1982, an album 1983, a timepiece 1984, a payment 1985 or offering of health care (e.g., measuring an exercise quantity, blood sugar, or the like) or environment information (e.g., information of barometric pressure, humidity, temperature, or the like).

According to an embodiment, the application 1970 may include an application (hereinafter referred to as "information exchanging application" for descriptive convenience) to support information exchange between an electronic device (e.g., the electronic device 1701) and an external electronic device (e.g., the electronic device 1702 or 1704). The information exchanging application may include, for example, a notification relay application for transmitting specific information to an external electronic device, or a device management application for managing the external electronic device.

For example, the notification relay application may include a function of transmitting notification information, which arise from other applications (e.g., applications for SMS/MMS, e-mail, health care, or environmental information), to an external electronic device (e.g., the electronic device 1702 or 1704). Additionally, the information exchanging application may receive, for example, notification information from an external electronic device and provide the notification information to a user.

The device management application may manage (e.g., install, delete, or update), for example, at least one function (e.g., turn-on/turn-off of an external electronic device itself (or a part of elements) or adjustment of brightness (or resolution) of a display) of the external electronic device (e.g., the electronic device 1702 or 1704) which communicates with the electronic device, an application running in the external electronic device, or a service (e.g., a call service, a message service, or the like) provided from the external electronic device.

According to an embodiment, the application 1970 may include an application (e.g., a health care application of a mobile medical device) that is assigned in accordance with an attribute of an external electronic device (e.g., the electronic device 1702 or 1704). According to an embodiment, the application 1970 may include an application that is received from an external electronic device (e.g., the electronic device 1702 or 1704, or the server 1706). According to an embodiment, the application 1970 may include a preloaded application or a third party application that is downloadable from a server. The names of elements of the program module 1910 according to the embodiment may be modifiable depending on kinds of operating systems.

According to various embodiments, at least a portion of the program module 1910 may be implemented by software, firmware, hardware, or a combination of two or more thereof. At least a portion of the program module 1910 may be implemented (e.g., executed), for example, by the processor (e.g., the processor 1810). At least a portion of the program module 1910 may include, for example, modules, programs, routines, sets of instructions, processes, or the like for performing one or more functions.

An electronic device according to an embodiment may include a housing that includes a first surface facing a first direction and a second surface facing a second direction opposite to the first direction, a display that is interposed between the first surface and the second surface and exposed through the first surface, a touch sensor that is interposed between the first surface and the second surface and senses a touch of an external object on the display, a force sensor that is interposed between the first surface and the second surface and senses pressure by the touch, a processor that is electrically connected with the display, the touch sensor, and the force sensor, and a memory that is electrically connected with the processor. The memory may store instructions that, when executed, cause the processor to activate at least part of the force sensor while the display is turned off or while the display operates in a low-power mode, to perform a first function if pressure of a first level by the touch is sensed in the at least part of the force sensor, and to perform a second function associated with the first function if pressure of a second level by the touch is sensed in the force sensor while the first function is performed.

According to an embodiment, the instructions may cause the processor to activate the at least part of the force sensor if a specified condition is satisfied while the display is turned off or while the display operates in the low-power mode.

According to an embodiment, the instructions may cause the processor to deactivate the at least part of the force sensor if a specified condition is satisfied while the display is turned off or while the display operates in the low-power mode.

According to an embodiment, the instructions may cause the processor to activate a specified area of the force sensor while the display is turned off or while the display operates in a low-power mode.

According to an embodiment, the instructions may cause the processor to decrease a frequency of an electrical signal supplied to sense the pressure to the force sensor if the display is turned off or operates in the low-power mode.

According to an embodiment, the instructions may cause the processor to determine the first function based on at least one of a location at which the pressure of the first level is sensed, the intensity of the pressure of the first level, the number of points at which the pressure of the first level is sensed, a speed of the sensed pressure of the first level, a direction of the sensed pressure of the first level, or duration of the sensed pressure of the first level, and to determine the second function based on at least one of a location at which the pressure of the second level is sensed, the intensity of the pressure of the second level, the number of points at which the pressure of the second level is sensed, a speed of the sensed pressure of the second level, a direction of the sensed pressure of the second level, or duration of the sensed pressure of the second level.

According to an embodiment, the instructions may cause the processor to activate at least part of the display or the touch sensor if the pressure of the first level or the pressure of the second level is sensed in the at least part of the force sensor.

According to an embodiment, the instructions may cause the processor to display, if the pressure of the first level by the touch is sensed, first information in a partial area of the display corresponding to a first point at which the pressure of the first level is sensed and to display, if the pressure of the second level by the touch is sensed at a second point distinct from the first point, second information in another partial area of the display corresponding to the second point.

According to an embodiment, the instructions may cause the processor to display, if the pressure of the first level is sensed, a user interface associated with hardware mapped onto a point at which the pressure of the first level is sensed, and to perform, if the pressure of the second level is sensed, a function associated with the user interface.

According to an embodiment, the instructions may cause the processor to display, if the pressure of the first level is sensed after a notification is generated in the electronic device, information associated with the notification in at least a partial area of the display, and to execute, if the pressure of the second level is sensed, an application associated with the notification.

According to an embodiment, the instructions may cause the processor to display, if the pressure of the first level is sensed while an application is executed in the electronic device, a user interface associated with the application in at least a partial area of the display, and to display, if the pressure of the second level is sensed, an execution screen of the application in the display.

According to an embodiment, the instructions may cause the processor to display, if the pressure of the second level is sensed, a user interface associated with the first function in the display that operates in the low-power mode.

An electronic device according to an embodiment may include a housing that includes a first surface facing a first direction and a second surface facing a second direction that is opposite to the first direction, a display that is interposed between the first surface and the second surface and exposed through the first surface, a touch sensor that is interposed between the first surface and the second surface and configured to sense a touch of an external object on the display, a force sensor that is interposed between the first surface and the second surface and configured to sense pressure by the touch, at least one processor that is electrically connected with the display, the touch sensor, and the force sensor, and a memory that is electrically connected with the processor. The memory may store instructions that, when executed, cause the processor to activate at least part of the force sensor while the display is turned off or while the display operates in a low-power mode, to receive data associated with the pressure by the touch from the force sensor while the display is turned off or while the display operates in a low-power mode, to determine whether the pressure is larger than or equal to a specified level, based on the data associated with the pressure, and to turn on, if the pressure is larger than or equal to the specified level, the display partially and perform a function.

According to an embodiment, the instructions may cause the processor to display a user interface on a partial area of the display to receive a user input while the function is performed.

According to an embodiment, the electronic device may further include a speaker, and the function may include a control of a volume of the speaker.

According to an embodiment, the instructions may cause the processor to deactivate the touch sensor partially while the display is turned off.

According to an embodiment, the electronic device may further include a microphone that receives sound from the outside. The instructions may cause the processor to execute an application for voice recognition if the pressure is sensed, and to perform, if a voice is received through the microphone, a function corresponding to the voice.

According to an embodiment, the instructions may cause the processor to display, if a notification is generated based at least partially on at least one internal event or a signal from an external device while the display is turned off or while the display operates in the low-power mode, a message associated with the notification on part of the display, to activate the force sensor after the notification is generated, to receive data associated with the pressure from the force sensor while the message is displayed, to determine whether the pressure is larger than or equal to a specified level, based on the data associated with the pressure, and to perform, if the pressure is larger than or equal to the specified level, a function associated with the notification.

An electronic device according to an embodiment may include a housing that includes a first surface facing a first direction and a second surface facing a second direction opposite to the first direction, a display that is interposed between the first surface and the second surface and is exposed through the first surface, a touch sensor that is interposed between the first surface and the second surface and senses a touch of an external object on the display, a force sensor that is interposed between the first surface and the second surface and senses pressure by the touch, a wireless communication circuit that communicates with an external device, at least one processor that is electrically connected with the display, the touch sensor, the force sensor, and the wireless communication circuit, and a memory that is electrically connected with the processor. The memory may store at least one application program including a user interface and may further store instructions that, when executed, cause the processor to execute the application program while at least part of the display is turned off or while the at least part of the display operates in a low-power mode, to activate the force sensor while the application program is executed, to receive data associated with the pressure by the touch from the force sensor while the application program is executed, to determine whether the pressure is larger than or equal to a specified level, based on the data associated with the pressure, and to perform, if the pressure is larger than or equal to the specified level, a function associated with the application program.

According to an embodiment, the at least one application program may include a music player application program, and the function may be associated with at least one of a control of a voice or a play of music.

The term "module" used in this disclosure may represent, for example, a unit including one or more combinations of hardware, software and firmware. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific IC (ASIC) chip, a field-programmable gate array (FPGA), and a programmable-logic device for performing some operations, which are known or will be developed.

At least a part of an apparatus (e.g., modules or functions thereof) or a method (e.g., operations) according to various embodiments may be, for example, implemented by instructions stored in a computer-readable storage media in the form of a program module. The instruction, when executed by a processor (e.g., the processor 1720), may cause the one or more processors to perform a function corresponding to the instruction. The computer-readable storage media, for example, may be the memory 1730.

A computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), and hardware devices (e.g., a read only memory (ROM), a random access memory (RAM), or a flash memory). Also, a program instruction may include not only a mechanical code such as things generated by a compiler but also a high-level language code executable on a computer using an interpreter. The above hardware unit may be configured to operate via one or more software modules for performing an operation of various embodiments of the present disclosure, and vice versa.

A module or a program module according to various embodiments may include at least one of the above elements, or a part of the above elements may be omitted, or additional other elements may be further included. Operations performed by a module, a program module, or other elements according to various embodiments may be executed sequentially, in parallel, repeatedly, or in a heuristic method. In addition, some operations may be executed in different sequences or may be omitted. Alternatively, other operations may be added.

According to embodiments disclosed in this specification, there may be provided an electronic device capable of easily executing a specified function in a standby state by sensing pressure by an external object while a display is turned off.

According to embodiments disclosed in this specification, there may be provided an electronic device capable of conveniently executing a function associated with a notification generated in the electronic device in the standby state by performing the function associated with the notification if pressure by an external object is sensed.

According to embodiments disclosed in this specification, there may be provided an electronic device capable of conveniently executing a function associated with an application being executed in the electronic device in the standby state by performing the function associated with the application if pressure by an external object is sensed.

According to embodiments disclosed in this specification, there may be provided an electronic device capable of intuitively executing various functions in the standby state by sensing two or more pressures from one touch in the standby state and performing two or more functions based on the sensed pressure.

Besides, a variety of effects directly or indirectly understood through this disclosure may be provided.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An electronic device comprising:
a housing including a first surface facing a first direction and a second surface facing a second direction that is opposite to the first direction;
a display interposed between the first surface and the second surface and exposed through the first surface;
a touch sensor interposed between the first surface and the second surface and configured to sense a touch of an external object on the display;
a force sensor interposed between the first surface and the second surface and configured to sense pressure by the touch;
a processor electrically connected with the display, the touch sensor, and the force sensor; and
a memory electrically connected with the processor,
wherein the memory stores instructions that, when executed, cause the processor to:
decrease a frequency of waves of an electrical signal supplied to sense the pressure to the force sensor if the display is turned off or while the display operates in a low-power mode;
activate a partial area of the force sensor while an entire area of the display is turned off;
display, if pressure of a first level by the touch is sensed in the partial area of the force sensor while an application is executed, a first user interface associated with the application in at least a partial area of the display, wherein the first user interface associated with the application includes at least one virtual object associated with at least one function of the application;
display, if pressure of a second level by the touch is sensed in the partial area of the force sensor while the first user interface is displayed, a second user interface different from the first user interface;
execute, in response to an input at the at least one virtual object, the at least one function of the application, wherein the at least one function is executed independent of an execution screen of the application;
display, if pressure of a third level by the touch is sensed in the force sensor while the second user interface is displayed, the execution screen of the application in a whole area of the display;
display, if the pressure of the first level by the touch is sensed in the partial area of the force sensor while no application is executed, information or a third user interface associated with a function of the electronic device; and
increase the frequency of waves of the electrical signal supplied to sense the pressure to the force sensor, during a specified time after at least one of the pressure of the first level or the pressure of the second level is sensed in the partial area of the force sensor while the display is turned off or while the display operates in the low-power mode.

2. The electronic device of claim 1, wherein the instructions cause the processor to:
activate at least part of the force sensor if a specified condition is satisfied while the display is turned off or while the display operates in the low-power mode.

3. The electronic device of claim 1, wherein the instructions cause the processor to:
deactivate at least part of the force sensor if a specified condition is satisfied while the display is turned off or while the display operates in the low-power mode.

4. The electronic device of claim 1, wherein the instructions cause the processor to:
display the first user interface based on at least one of a location at which the pressure of the first level is sensed, an intensity of the pressure of the first level, a number of points at which the pressure of the first level is sensed, a speed of the sensed pressure of the first level, a direction of the sensed pressure of the first level, or a duration of the sensed pressure of the first level; and
display the execution screen of the application based on at least one of a location at which the pressure of the second level is sensed, an intensity of the pressure of the second level, a number of points at which the pressure of the second level is sensed, a speed of the sensed pressure of the second level, a direction of the sensed pressure of the second level, or a duration of the sensed pressure of the second level.

5. The electronic device of claim 1, wherein the instructions cause the processor to:
activate at least part of the display or the touch sensor if the pressure of the first level or the pressure of the second level is sensed in at least part of the force sensor.

6. The electronic device of claim 1, wherein the instructions cause the processor to:
display, if the pressure of the first level by the touch is sensed, first information in the partial area of the display corresponding to a first point at which the pressure of the first level is sensed; and
display, if the pressure of the second level by the touch is sensed at a second point distinct from the first point, second information in another partial area of the display corresponding to the second point.

7. The electronic device of claim 1, wherein the instructions cause the processor to:
display, if the pressure of the first level is sensed, a user interface associated with hardware mapped onto a point at which the pressure of the first level is sensed; and
perform, if the pressure of the second level is sensed, a function associated with the user interface.

8. The electronic device of claim 1, wherein the instructions cause the processor to:
display, if the pressure of the first level is sensed after a notification is generated in the electronic device, information associated with the notification in at least the partial area of the display; and
execute, if the pressure of the second level is sensed, an application associated with the notification.

9. An electronic device comprising:
a housing including a first surface facing a first direction and a second surface facing a second direction that is opposite to the first direction;
a display interposed between the first surface and the second surface and exposed through the first surface;
a touch sensor interposed between the first surface and the second surface and configured to sense a touch of an external object on the display;
a force sensor interposed between the first surface and the second surface and configured to sense pressure by the touch;
at least one processor electrically connected with the display, the touch sensor, and the force sensor; and
a memory electrically connected with the processor,
wherein the memory stores instructions that, when executed, cause the processor to:
decrease a frequency of waves of an electrical signal supplied to sense the pressure to the force sensor if the display is turned off or while the display operates in a low-power mode;

activate a partial area of the force sensor while an entire area of the display is turned off;

receive data associated with the pressure by the touch from the force sensor while the display is turned off or while the display operates in the low-power mode;

determine whether the pressure is larger than or equal to a first level, based on the data associated with the pressure;

turn on, if the pressure is larger than or equal to the first level, the display at least partially;

display, if an application is executed, a first user interface associated with the application in at least a partial area of the display, wherein the first user interface associated with the application includes at least one virtual object associated with at least one function of the application;

display, if pressure of a second level by the touch is sensed in the partial area of the force sensor while the first user interface is displayed, a second user interface different from the first user interface;

execute, in response to an input at the at least one virtual object, the at least one function of the application, wherein the at least one function is executed independent of an execution screen of the application;

display, if pressure of a third level by the touch is sensed in the force sensor while the second user interface is displayed, the execution screen of the application in a whole area of the display;

display, if the pressure of the first level by the touch is sensed in the partial area of the force sensor while no application is executed, information or a third user interface associated with a function of the electronic device; and increase the frequency of waves of the electrical signal supplied to sense the pressure to the force sensor, during a specified time after at least one of the pressure of the first level or the pressure of the second level is sensed in the partial area of the force sensor while the display is turned off or while the display operates in the low-power mode.

10. The electronic device of claim 9, wherein the electronic device further includes a speaker, and
wherein the at least one function includes a control of a volume of the speaker.

11. The electronic device of claim 9, wherein the instructions cause the processor to:
deactivate the touch sensor at least partially while the display is turned off.

12. The electronic device of claim 9, further comprising:
a microphone configured to receive sound from an exterior of the electronic device,
wherein the instructions cause the processor to:
execute an application for voice recognition if the pressure is sensed; and
perform, if a voice is received through the microphone, another function corresponding to the voice.

13. The electronic device of claim 9, wherein the instructions cause the processor to:
display, if a notification is generated based at least partially on at least one internal event or a signal from an external device while the display is turned off or while the display operates in the low-power mode, a message associated with the notification on part of the display;
activate the force sensor after the notification is generated;
receive data associated with the pressure from the force sensor while the message is displayed;
determine whether the pressure is larger than or equal to a specified level, based on the data associated with the pressure; and
perform, if the pressure is larger than or equal to the specified level, another function associated with the notification.

* * * * *